(12) United States Patent
Liu et al.

(10) Patent No.: US 10,468,965 B2
(45) Date of Patent: Nov. 5, 2019

(54) MULTI-STAGE MULTILEVEL DC-DC STEP-DOWN CONVERTER

(71) Applicant: Queen's University at Kingston, Kingston (CA)

(72) Inventors: Tianshu Liu, Mississauga (CA); Yan-Fei Liu, Kingston (CA)

(73) Assignee: Queen's University at Kingston, Kingston, ON (CA)

( * ) Notice: Subject to any disclaimer, the term of this patent is extended or adjusted under 35 U.S.C. 154(b) by 0 days.

(21) Appl. No.: 15/643,023

(22) Filed: Jul. 6, 2017

(65) Prior Publication Data
US 2018/0026518 A1   Jan. 25, 2018

Related U.S. Application Data

(60) Provisional application No. 62/446,516, filed on Jan. 15, 2017, provisional application No. 62/359,265, filed on Jul. 7, 2016.

(51) Int. Cl.
| | | |
|---|---|---|
| *H02M 3/158* | (2006.01) | |
| *H02M 1/088* | (2006.01) | |
| *H02M 1/00* | (2006.01) | |

(52) U.S. Cl.
CPC ........... *H02M 1/088* (2013.01); *H02M 3/158* (2013.01); *H02M 3/1584* (2013.01); *H02M 2001/0054* (2013.01); *Y02B 70/1491* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 3/156; H02M 3/158; H02M 3/1588; H02M 3/155; H02M 3/1582; H02M 3/157; H02M 3/1563
USPC ................................. 323/282–285, 312–317
See application file for complete search history.

(56) References Cited

U.S. PATENT DOCUMENTS

| | | |
|---|---|---|
| 6,349,044 B1 | 2/2002 | Canales-Abarca et al. |
| 6,984,965 B2 | 1/2006 | Vinciarelli |
| 7,564,702 B2 | 7/2009 | Schlecht |
| 8,023,290 B2 | 9/2011 | Schlecht |
| 8,493,751 B2 | 7/2013 | Schlect |
| 9,035,625 B2 | 5/2015 | Burns et al. |
| 9,667,157 B1 * | 5/2017 | Dong ................... G01R 19/175 |

(Continued)

OTHER PUBLICATIONS

Ganesan, G. et al., "Multi-Level DC-DC Converter for High Gain Applications", IJPEDS, vol. 3, No. 4 pp. 365-373, (2013).

(Continued)

*Primary Examiner* — Nguyen Tran
*Assistant Examiner* — Bryan R Perez
(74) *Attorney, Agent, or Firm* — Stephen J. Scribner

(57) ABSTRACT

Disclosed are multi-stage multilevel DC-DC step-down converters. Stages may include three or four switches, and switches of each stage are operated at selected duty cycles such that each stage reduces an input voltage by one-half and voltage stress on switches is reduced. In some embodiments only a single output inductor is used in an LC filter, and the inductor may be very small as compared with a conventional Buck converter. Thus, embodiments provide DC-DC step-down converters with high power density and efficiency.

13 Claims, 25 Drawing Sheets

(56) References Cited

U.S. PATENT DOCUMENTS

| | | | |
|---|---|---|---|
| 2006/0273768 A1* | 12/2006 | Chen | H02M 3/157 |
| | | | 323/224 |
| 2015/0194842 A1 | 7/2015 | Mondal | |
| 2015/0263634 A1 | 9/2015 | Fu | |
| 2016/0094136 A1* | 3/2016 | Fu | H02M 3/1582 |
| | | | 363/21.02 |

OTHER PUBLICATIONS

Li, R.T.H., et al., "High Performance DC-DC Converter for Wide Voltage Range Operation", IEEE, 7th International Power Electronics and Motion Control Conference, ECCE Asia, pp. 1151-1158, (2012).

* cited by examiner

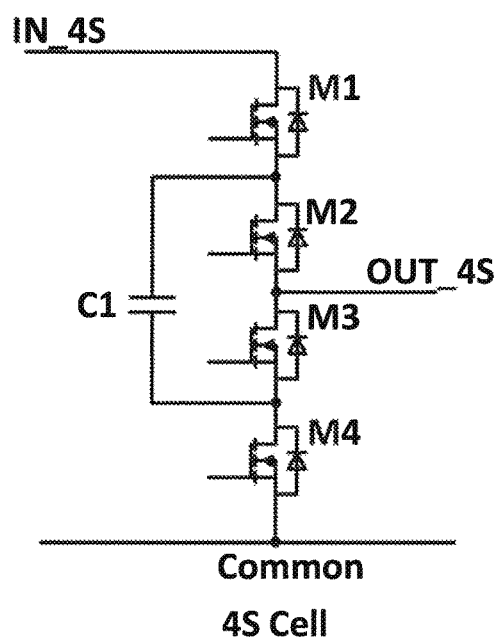
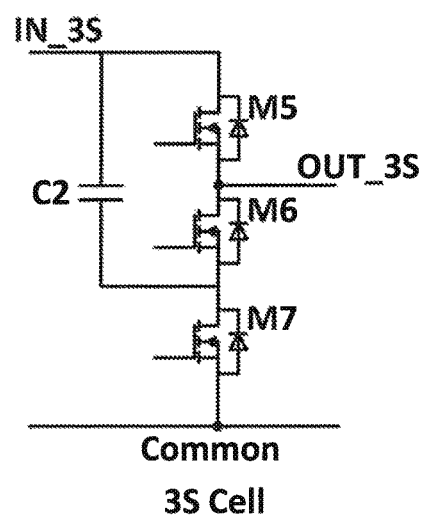
Fig. 2B
Fig. 2C

Two 4S Cell DC-DC Converter

MULTI-STAGE MULTILEVEL DC-DC STEP-DOWN CONVERTER

RELATED APPLICATIONS

This application claims the benefit of the filing date of U.S. Application No. 62/446,516, filed Jan. 15, 2017, and U.S. Application No. 62/359,265, filed Jul. 7, 2016, the contents of which are incorporated herein by reference in their entirety.

FIELD

This invention relates to DC-DC converters. More specifically, this invention provides multi-stage multilevel DC-DC converter architectures that reduce voltage stress on switches and inductors, reduce the size of the converter, increase power density, and improve efficiency.

BACKGROUND

Previously, 12V DC bus voltage has been widely used for motherboards of servers in applications such as data centers. More recently, 48V power distribution has been used, which can provide better efficiency and performance for the high power demands of computing systems in data centres. In current 48V rack-level UPS systems, 48V is directly provided to the motherboards in servers and is converted down in one stage, using one power converter, or one power conversion stage, to a lower voltage level required by CPUs and GPUs, such as from 1V to 3.3V.

Multi-phase Buck point-of-load (POL) converters, as shown in FIG. 1, are the dominant architecture of step down converters in applications for converting 48V to a much lower voltage level (e.g., 1V to 3.3V). As the required inductance value of the Buck converter is directly proportional to the voltage difference between the input and output of the converter, the inductance value increases with increasing voltage difference (such as from 48V to 1V). Accordingly, the volume of the inductors in Buck converter will increase as well, which lowers power density. Additionally, the 48V input voltage increases voltage stress on the switches which leads to higher switching losses. Therefore, there are drawbacks to current approaches for implementing 48V DC bus architecture in applications such as motherboards of servers.

SUMMARY

Disclosed are multi-stage multilevel DC-DC step-down converters. In various embodiments, stages may include three or four switches, and switches of each stage are operated at selected duty cycles such that each stage reduces an input voltage by one-half, voltage stress on switches is reduced, and an output inductor may be very small as compared with a conventional Buck converter.

According to one aspect, there is provided a method for controlling a DC-DC converter, wherein the DC-DC converter comprises at least one stage, wherein the at least one stage is a first stage comprising: first and second input terminals and first and second output terminals, wherein the second input terminal and the second output terminal are connected together as a common terminal; first, second, third, and fourth switches connected together in series across the first and second input terminals; a first capacitor connected in parallel with the second and third switches; a first inductor having a first terminal connected between the second and third switches and a second terminal connected to a first output terminal; and a second capacitor connected across the first and second output terminals;

wherein the method comprises: turning on the first and third switches for a first selected portion of a first switching cycle; turning on the second and fourth switches for a second selected portion of the first switching cycle; wherein the first and second selected portions of the first switching cycle are each 50%; wherein an output DC voltage of the DC-DC converter is 0.5 times an input DC voltage of the DC-DC converter; and wherein a voltage across the first inductor is substantially zero volts.

In one embodiment, a DC-DC converter may comprise a second stage; wherein the second stage comprises fifth, sixth, seventh, and eighth switches connected together in series, a second stage first input terminal connected to an input terminal of the fifth switch, a second stage first output terminal connected to a point between the sixth and seventh switches, and a third capacitor connected in parallel with the sixth and seventh switches; wherein the second stage first input terminal is connected between the second and third switches and the second stage first output terminal is connected to the first terminal of the first inductor;

wherein the method comprises: turning on the first and third switches for a first 25% of a first switching cycle at a first switching frequency; turning on the second and fourth switches for a second 25% of the first switching cycle at the first switching frequency; turning on the fifth and seventh switches for a first 50% of a first switching cycle at a second switching frequency; turning on the sixth and eighth switches for a second 50% of the first switching cycle at the second switching frequency; wherein an output DC voltage of the DC-DC converter is 0.25 times an input DC voltage of the DC-DC converter; and wherein a voltage across the first inductor is substantially zero volts and a voltage across the second inductor is substantially zero volts.

In one embodiment, a DC-DC converter may comprise a second stage connected between the second capacitor of the first stage and the output terminals; wherein the second stage comprises fifth, sixth, seventh, and eighth switches connected together in series across the second capacitor; a third capacitor connected in parallel with the sixth and seventh switches; a second inductor having a first terminal connected between the sixth and seventh switches and a second terminal connected to the first output terminal; and a fourth capacitor connected across the first and second output terminals;

wherein the method comprises: turning on the first and third switches for a first 50% of a first switching cycle at a first switching frequency; turning on the second and fourth switches for a second 50% of the first switching cycle at the first switching frequency; turning on the fifth and seventh switches for a first 50% of a first switching cycle at a second switching frequency; turning on the sixth and eighth switches for a second 50% of the first switching cycle at the second switching frequency; wherein an output DC voltage of the DC-DC converter is 0.25 times an input DC voltage of the DC-DC converter; and wherein a voltage across the first inductor is substantially zero volts and a voltage across the second Inductor is substantially zero volts.

In one embodiment, a DC-DC converter may comprise a second stage connected between the third and fourth switches of the first stage and the first inductor; wherein the second stage comprises fifth, sixth, and seventh switches connected together in series across the third and fourth switches; a third capacitor connected in parallel with the fifth and sixth switches; wherein the first terminal of the first inductor is connected between the fifth and sixth switches and the second terminal of the first inductor is connected to the first output terminal; and the second capacitor is connected across the first and second output terminals;

wherein the method comprises: turning on the first and third switches for a first 25% of a switching cycle; turning on the second and fourth switches for a second 25% of the switching cycle; turning on the fifth and seventh switches for a first 50% of the switching cycle; turning on the sixth switch for a second 50% of the switching cycle; wherein an output DC voltage of the DC-DC converter is 0.25 times an input DC voltage of the DC-DC converter; and wherein a voltage across the first inductor is substantially zero volts.

In one embodiment, a DC-DC converter may comprise a third stage connected between the sixth and seventh switches of the second stage and the first inductor; wherein the third stage comprises eighth, ninth, and tenth switches connected together in series across the sixth and seventh switches; a fourth capacitor connected in parallel with the eighth and ninth switches; wherein the first terminal of the first inductor is connected between the eighth and ninth switches and the second terminal of the first inductor is connected to the first output terminal; and the second capacitor is connected across the first and second output terminals;

wherein the method comprises: turning on the first and third switches for a first 12.5% of a switching cycle; turning on the second and fourth switches for a second 12.5% of the switching cycle; turning on the fifth and seventh switches for a first 25% of the switching cycle; turning on the sixth switch for a second 25% of the switching cycle; turning on the eighth and ninth switches for a first 50% of the switching cycle; turning on the tenth switch for a second 50% of the switching cycle; wherein an output DC voltage of the DC-DC converter is 0.125 times an input DC voltage of the DC-DC converter; and wherein a voltage across the first inductor is substantially zero volts.

In various embodiments, the first switching frequency and the second switching frequency are different; or the first switching frequency and the second switching frequency are the same and a phase of the first stage and a phase of the second stage are different, or the first switching frequency and the second switching frequency are the same and a phase of the first stage and a phase of the second stage are the same.

In various embodiments, the method may include controlling a dead time of switches of one or more stages, wherein controlling the dead time minimizes a volt-second produced across the first inductor for a duration of the dead time. The duration of the dead time may be controlled to be less than 200 nanoseconds.

According to another aspect of the invention, there is provided a DC-DC converter, comprising: a first input terminal adapted to receive an input DC voltage; a common terminal; a first four switch (4S) stage comprising: first, second, third, and fourth switches connected together in series across the first input terminal and the common terminal; a first capacitor connected in parallel with the series-connected second and third switches; a 4S input point connected to an input terminal of the first switch; a 4S output point at a first node between the second and third switches; a common terminal connected to an output terminal of the fourth switch; an output circuit comprising a series inductor, a parallel capacitor, and a first output terminal adapted to output a DC voltage; and a controller that controls the 4S switches such that the first and third switches are switched on and off together, the second and fourth switches are switched on and off together, the first and third switches are not on when the second and fourth switches are on, and the duty cycle of the switches is 50% or less; wherein an output DC voltage is one-half of the input DC voltage.

In one embodiment, a DC-DC converter may comprise a second 4S stage; wherein the second 4S stage comprises fifth, sixth, seventh, and eighth switches connected together in series, a second 4S stage first input point connected to an input terminal of the fifth switch, a second 4S stage first output point connected between the sixth and seventh switches, and a third capacitor connected in parallel with the sixth and seventh switches; wherein the second 4S stage first input point is connected between the second and third switches and the second 4S stage first output point is connected to a first terminal of the series inductor; a controller that controls the first 4S stage switches and the second 4S stage switches such that: the first and third switches are switched on and off together for a first 25% of a first switching cycle at a first switching frequency; the second and fourth switches are switched on and off together for a second 25% of the first switching cycle at the first switching frequency; the fifth and seventh switches are switched on and off together for a first 50% of a first switching cycle at a second switching frequency; and the sixth and eighth switches are switched on and off together for a second 50% of the first switching cycle at the second switching frequency; wherein an output DC voltage of the DC-DC converter is 0.25 times an input DC voltage of the DC-DC converter; and wherein a voltage across the series inductor is substantially zero volts.

In one embodiment, a DC-DC may comprise a 4S stage and a three switch (3S) stage, wherein the 3S stage comprises: fifth, sixth, and seventh switches connected together in series; a 3S input point connected to an input terminal of the fifth switch; a 3S output point connected to an output terminal of the fifth switch; a second capacitor connected in parallel with the series-connected fifth and sixth switches; and a common terminal connected to an output terminal of the seventh switch; wherein the 3S input point is connected to the 4S output point of the 4S stage, and the 3S output point is connected to the output circuit; wherein the controller controls the 4S switches such that the duty cycle is 25%; and wherein the controller controls the 3S switches such that the fifth and seventh switches are switched on and off together, the sixth switch is switched on and off, the fifth and seventh switches are not on when the sixth switch is on, and the duty cycle of the 3S switches is 50%; wherein an output DC voltage is one-quarter of the input DC voltage.

In one embodiment, a DC-DC converter may comprise a 4S stage and first and second 3S stages; wherein the first and second 3S stages are cascaded by connecting the first 3S stage output point to the second 3S stage input point; wherein the first 3S stage input point is connected to the 4S output point of the 4S stage, and the second 3S stage output point is connected to the output circuit; wherein the controller controls the 4S switches such that the duty cycle is 12.5%; and wherein the controller controls the first 3S stage such that the duty cycle is 25%; wherein the controller controls the second 3S stage such that the duty cycle is 50%; wherein an output DC voltage is one-eighth of the input DC voltage.

In one embodiment, a DC-DC converter may comprise a 4S stage and three or more 3S stages; wherein the three or more 3S stages are cascadable by connecting a first 3S stage output point to a second 3S stage input point, connecting a second 3S stage output point to a third 3S stage input point, and continuing to a final 3S stage; wherein the first 3S stage input point is connected to the 4S output point of the 4S stage, and the final 3S stage output point is connected to the output circuit; wherein a total number of stages is N; wherein the controller controls switches of the $N^{th}$ stage such that the duty cycle is 50%, and controls the switches of each preceding stage such that the duty cycle decreases by half for each preceding stage; wherein the output DC voltage is equal to the input DC voltage divided by $2^N$.

In various embodiments, the controller further comprises a dead time control circuit, wherein the controller controls duration of the dead time to be less than 200 nanoseconds.

In various embodiments, the controller controls the first switching frequency and the second switching frequency to be different; or controls the first switching frequency and the second switching frequency to be the same and a phase of the first stage and a phase of the second stage to be different, or controls the first switching frequency and the second switching frequency to be the same and a phase of the first stage and a phase of the second stage to be the same.

BRIEF DESCRIPTION OF THE DRAWINGS

For a greater understanding of the invention, and to show more clearly how it may be carried into effect, embodiments will be described, by way of example, with reference to the accompanying drawings, wherein:

FIG. 2B is a circuit diagram of a 4S cell for use in DC-DC step-down converters according to embodiments described herein.

FIG. 2C is a circuit diagram of a 3S cell for use in DC-DC step-down converters according to embodiments described herein.

FIGS. 10, 11, and 12 show simulation results for the circuit of FIG. 3 or 4, wherein FIG. 10 shows capacitor voltages and current, FIG. 11 shows current waveforms for all the switches, and FIG. 12 shows inductor voltage and current waveforms.

DETAILED DESCRIPTION OF EMBODIMENTS

Figure 1:
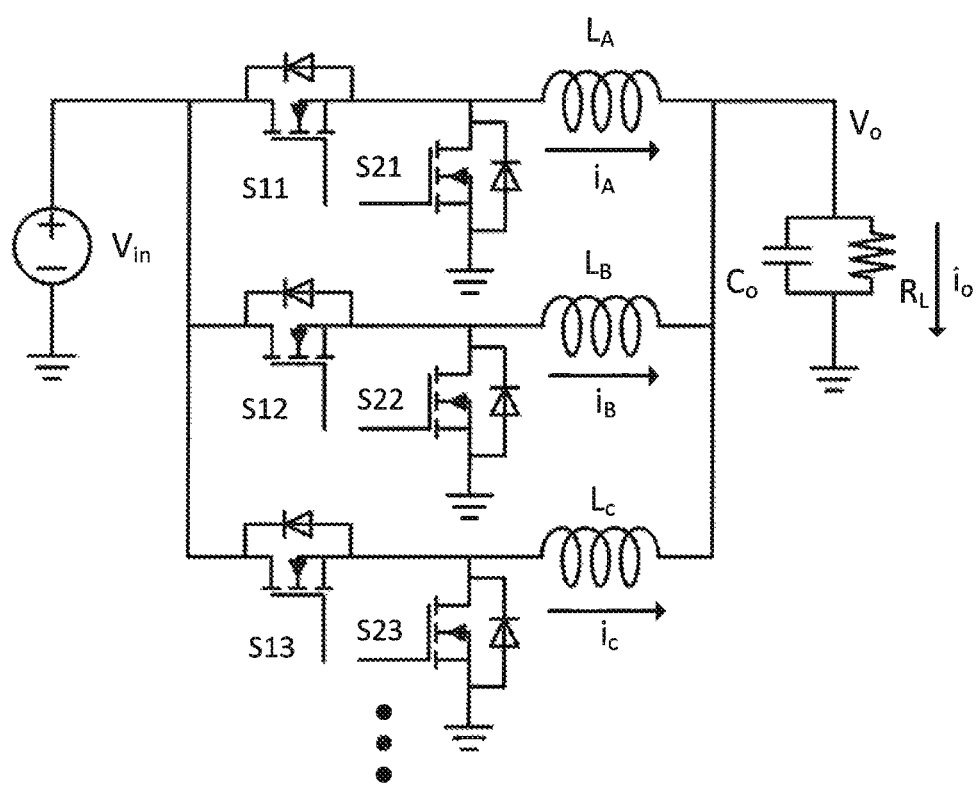
FIG. 1 is a circuit diagram of a multi-phase Buck point-of-load (POL) converter, according to the prior art.

Provided herein are multi-stage multilevel DC-DC step-down converters which overcome the drawbacks of prior approaches. As described herein, embodiments employ multi-stage multilevel architectures which reduce voltage stress on switches and inductors, reduce the size of the converter on the motherboard, thereby increasing power density, and improve efficiency of the power system. Embodiments are suitable for use in servers, and, because of their improved efficiency and high power density, they are particularly suitable for use in server-intense environments such as data centers. However, it will be appreciated that embodiments may also be used in other applications.

Also provided herein are methods for implementing multi-stage multilevel DC-DC step-down converters which overcome the drawbacks of prior approaches. As described herein, the methods provide multi-stage multilevel architectures which reduce voltage stress on switches and inductors, reduce the size the converter on the motherboard, thereby increasing power density, and improve efficiency of the power system. The methods are applicable to servers, and, because they improve efficiency and increase power density, they may be implemented in server-intense environments such as data centers, although they are not limited thereto.

As used herein, the term "switch" is intended to refer to a semiconductor switch where the current can flow in both directions and withstand voltage in one direction, such as IGBT with a parallel diode, or MOSFET where the parallel diode is inherent.

Throughout this disclosure, where a value is given, such as, for example, 0V, 50%, etc., it will be appreciated that the value may be a theoretical or design value and slight variation may be expected in a practical implementation due to factors such as component tolerances, ripple, etc. Such variation is intended to be covered by the embodiments described herein. In some instances the terms "substantially" or "approximately" may be used in respect of a value, and are intended to mean a value in a practical implementation that is exactly or close to a theoretical value, given practical limitations.

A multi-stage multilevel DC-DC step-down converter will now be described with reference to FIG. 2A. This embodiment includes multiple stages which are connected in cascade. The first stage, referred to as a 4S cell, has four switches (M1, M2, M3, and M4) connected in series and one flying capacitor (C1) connected across the middle of two switches (drain of M2 and source of M3). The input of the first stage (4S cell) is the drain of the first switch M1, which is connected to the input voltage V. FIG. 2B shows the topology of the 4S cell. The output of the 4S cell Is the source of switch M2 (which is connected to the drain of the third switch, M3), shown as point N1 in FIG. 2A, or OUT_4S in FIG. 2B. The source terminal of M4 is the common (or ground) connection of the 4S cell, which is connected to the negative terminal of $V_{in}$.

Figure 2A:
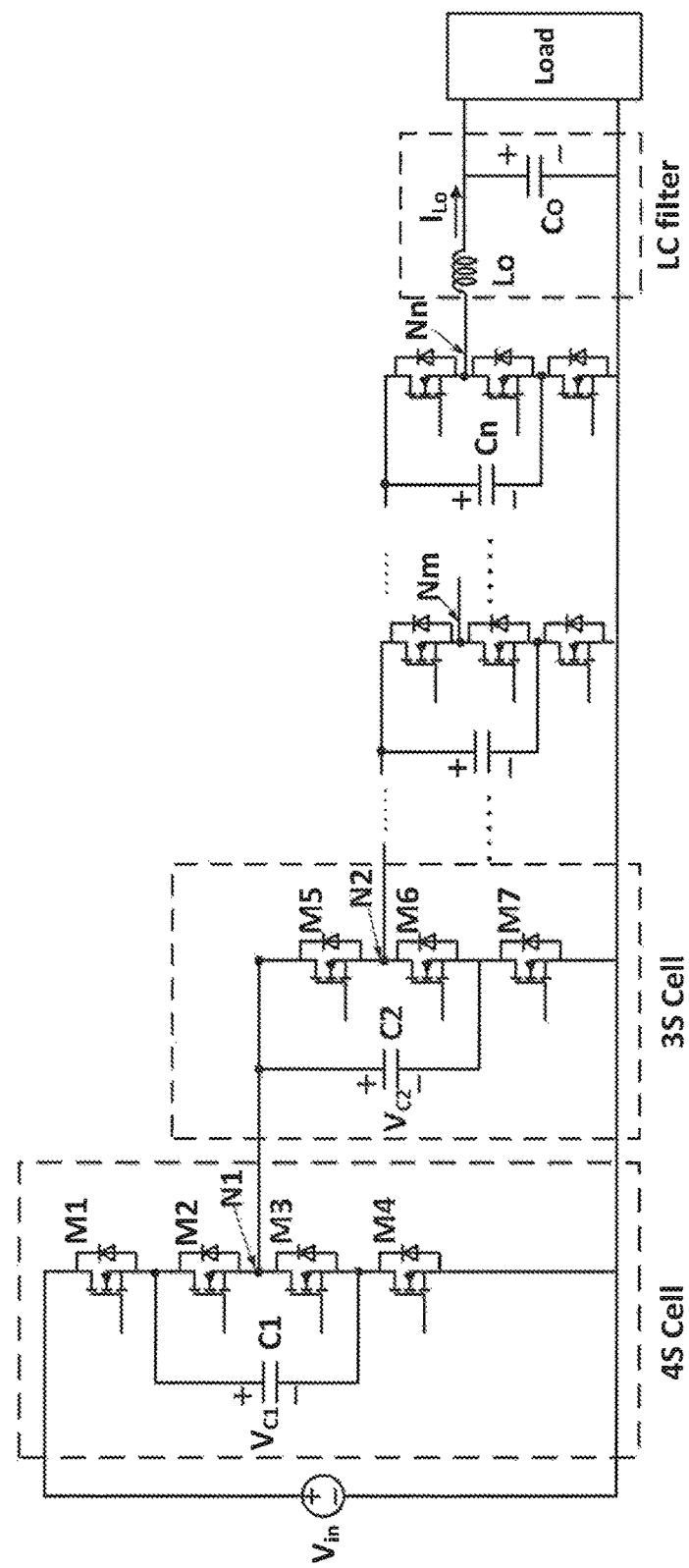
FIG. 2A is a circuit diagram of a multi-stage multilevel DC-DC step-down converter, according to one embodiment.

As shown in FIG. 2A, the first stage (4S cell) is followed by one or more further stages, referred to as 3S cells. Each 3S cell has three series connected switches (such as M5, M6, M7 as shown in FIGS. 2A and 2C) and one flying capacitor (such as C2 as shown in FIGS. 2A and 2C). In each 3S cell the positive terminal of the flying capacitor C2 is connected to the drain of the first switch M5. The negative terminal of the flying capacitor is connected to the source of the second switch M6. The source of the third switch M7 is connect to the common terminal, which is the negative terminal of $V_{in}$, or ground. The input of the 3S cell is at the drain of the first switch M5. The output of the 3S cell is at the source of the first switch M5, as shown as point N2 in FIG. 2A.

An LC filter, including series inductor Lo and parallel capacitor Co, is connected at the output of the last 3S cell, as shown in FIG. 2A. The load is connected in parallel with the filter capacitor Co. The load may be another DC-DC converter (such as, for example, a Buck converter) or a resistor, or any other device.

The total number of switches is 4+3*(N−1) where N represents the number of stages.

The total number of flying capacitors is N. For example, a two-stage converter (N=2), as shown in FIG. 3, has 4+3*(2−1)=7 switches.

According to the embodiments, each stage steps down the input voltage by one-half. Therefore, the output voltage of an N stage converter is $Vo=V_{in}/2^N$. For a two stage converter, as shown in FIG. 3, N=2, and Vo2=Vin/4. For a three stage converter, the first stage will be a 4S cell, the second stage will be a 3S cell, and the third stage will be a 3S cell. The output voltage Vo3 is Vin/8. It will be appreciated that the voltage stress on the switches of the $N^{th}$ stage is reduced to $V_{in}/2^N$. More detailed analysis will be provided in the following sections.

Two-Stage Multilevel DC-DC Step-Down Converter
Circuit Configuration

Figure 3:
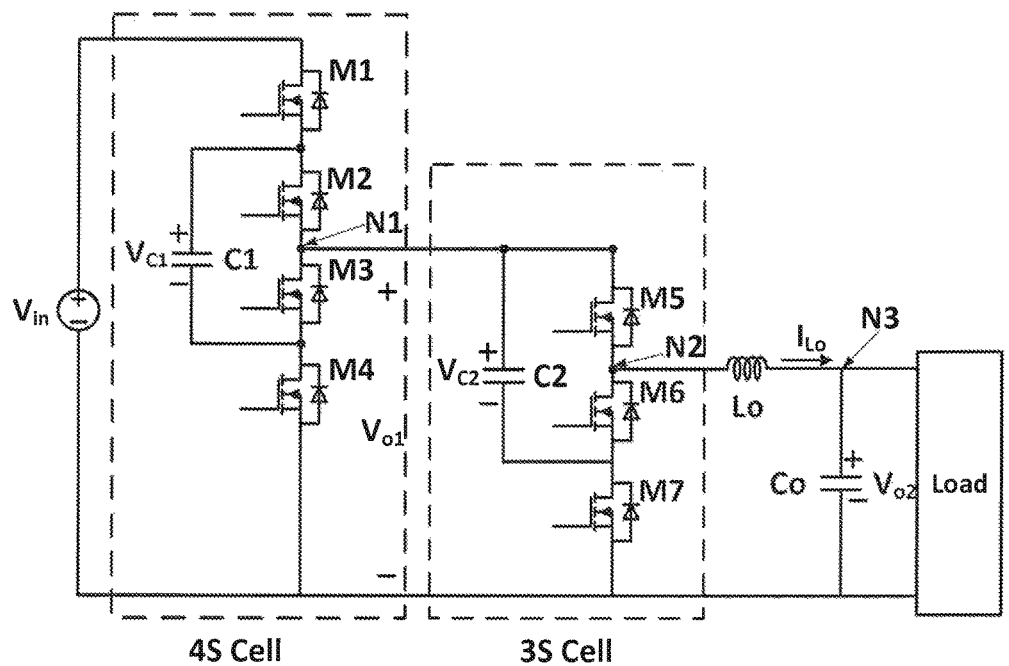
FIGS. 3 and 4 are circuit diagrams of a two-stage DC-DC step-down converter, according to one embodiment.
Figure 4:
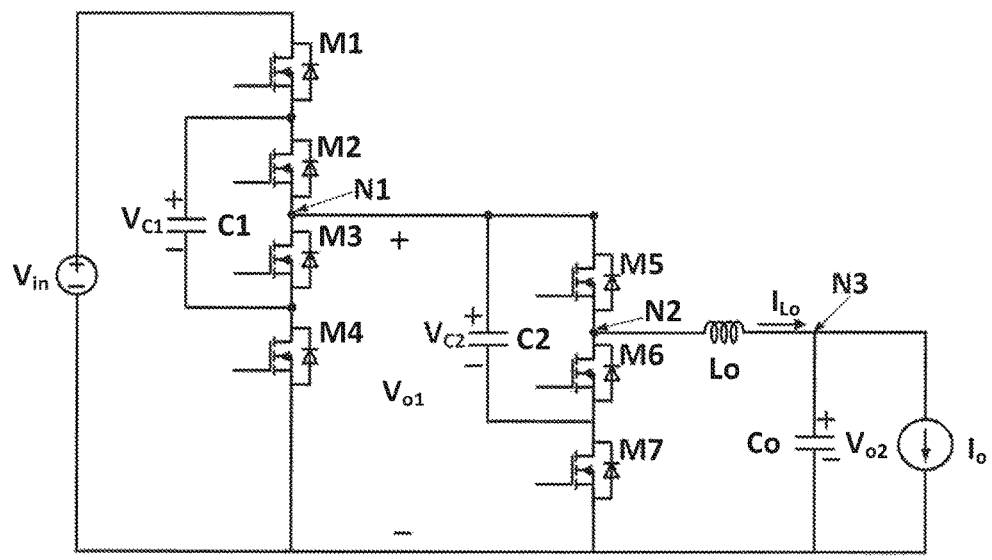

A two-stage (N=2) multilevel DC-DC step-down converter as shown in the embodiment of FIGS. 3 and 4 will be analyzed as an example. In this embodiment, the first stage is a 4S cell and the second stage is a 3S cell, as shown by the dashed lines in FIG. 3. Further description will be made with reference to FIG. 4. With a two stage configuration, the output voltage Vo2 equals to $V_{in}/2^2=V_{in}/4$. For example, 48V input voltage is reduced to 12V at the output. The load is connected to the point N3, as shown in FIG. 4. The 4S cell includes a first switch M1, a second switch M2, a third switch M3, and a fourth switch M4. The 3S cell includes a fifth switch M5, a sixth switch M6, and a seventh switch M7.

The input terminal of the 4S cell (the drain of M1) is connected to the positive terminal of the input voltage $V_{in}$. The source of M1 is connected to both the positive terminal of the first flying capacitor C1 and the drain of the second switch M2. The source of M2 is connected to the drain of the third switch M3. The source of the third switch M3 is connected to both the negative terminal of the first flying capacitor (C1) and the drain of the fourth switch M4. The source of M4 is connected to the common terminal and the negative terminal of $V_{in}$. The input of the 4S cell is the drain of the first switch M1. The output of the 4S cell is the source of the second switch M2, which is also the source of the third switch M3. The output of the 4S cell is indicated by point N1 in FIG. 4. The output of the 4S cell is connected to the input of the 3S cell.

In the 3S cell, the positive terminal of the second flying capacitor C2 is connected to the drain of the fifth switch M5. The source of the fifth switch is connected to the drain of the sixth switch M6. The source of the sixth switch M6 is connected to both the negative terminal of the second flying capacitor C2 and the drain of the seventh switch M7. An LC filter is connected to the output of the 3S cell and provides DC voltage to the load.

The output of the 4S cell (point N1) is connected to the input of the 3S cell (drain of M5), as shown in FIG. 4. The inductor of the output LC filter is connected to the output of the 3S cell (point N2 as shown in FIG. 4) and the load is connected in parallel with the output capacitor Co.

Operating Principle

For the purpose of this description, the term $V_{C1}$ refers to the first flying capacitor voltage, $V_{C2}$ refers to the second flying capacitor voltage, $V_{in}$ refers to the power supply input voltage, $V_{O1}$ refers to the output voltage from the first stage of converter (4S cell), $V_{o2}$ refers to the output voltage from the second stage of converter (3S cell). As an example, this description and the simulation described below are based on 48V input and 12V, 20 A output. Lo is 30 nH and Co is 500 μF, C1=200 μF, and C2=400 μF. One of ordinary skill in the art will understand that other values may be used and how such other values will cause the circuit to operate similarly. For example, discussion will also be valid for other values of the input voltage.

Figure 5:
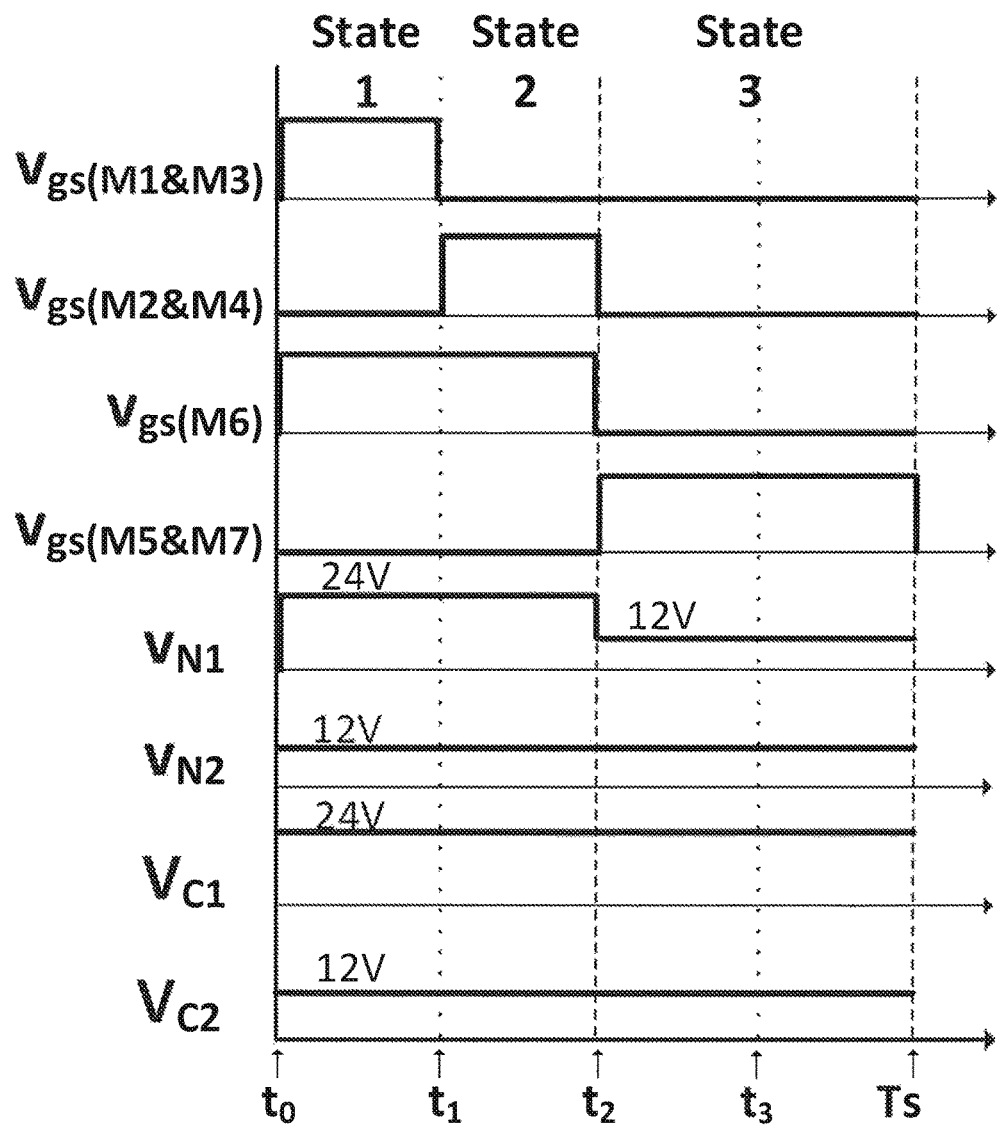
FIG. 5 is a timing diagram for the switches of the circuit of FIGS. 3 and 4, during one switching cycle Ts.

The first stage is a 4S cell and the second stage is a 3S cell, as shown in FIG. 4. FIG. 5 shows a timing diagram for each switch during one switching cycle Ts, as well as the node voltages at N1 and N2, and the voltage across capacitors C1 and C2. The operation of the circuit is described as follows: The duty cycle of switches M1, M2, M3, and M4 are all substantially 25%. The gate drive signals of M1 and M3 are substantially the same, shown as $V_{gs(M1\&M3)}$ in FIG. 5. The gate drive signals of M2 and M4 are substantially the same, shown as $V_{gs(M2\&M4)}$ in FIG. 5. It is noted that M1, M2, M3, and M4 are operating only during the first half of the switching cycle. In particular, M1 and M3 are on for the first 25% of the switching cycle, from t0 to t1. M2 and M4 are on for the second 25% of the switching cycle, from t1 to t2.

The duty cycle of M5, M6, and M7 are substantially 50%. M6 is on for the first 50% of the switching cycle (from t0 to t2) and M5, M7 are on for the second 50% of the switching cycle (from t2 to Ts). The gate drive signals of M5 and M7 are substantially the same.

Figure 6:
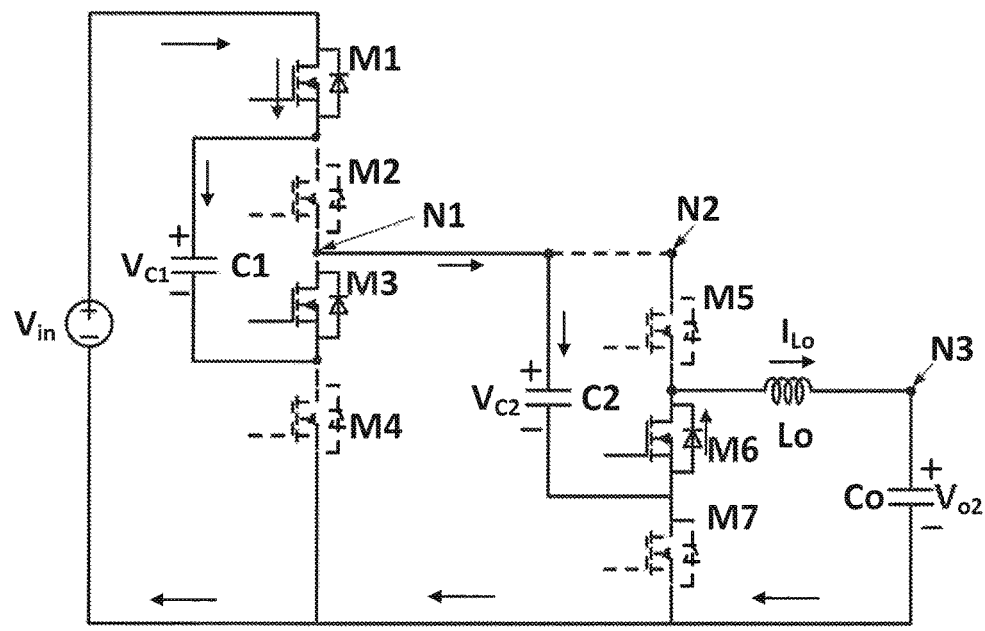
FIGS. 6, 7, and 8 are equivalent circuits for the two-stage DC-DC step-down converter of FIG. 4 during three operating states that make up one switching cycle, as shown in FIG. 5: State 1 (from t0 to t1), State 2 (from t1 to t2), and State 3 (from t2 to Ts), respectively.
Figure 7:
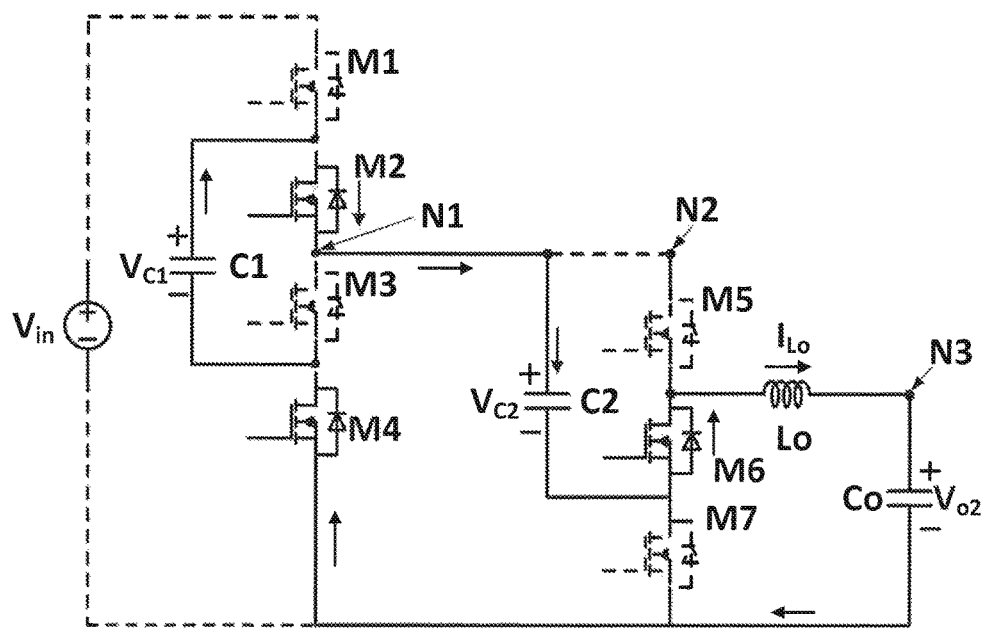
Figure 8:
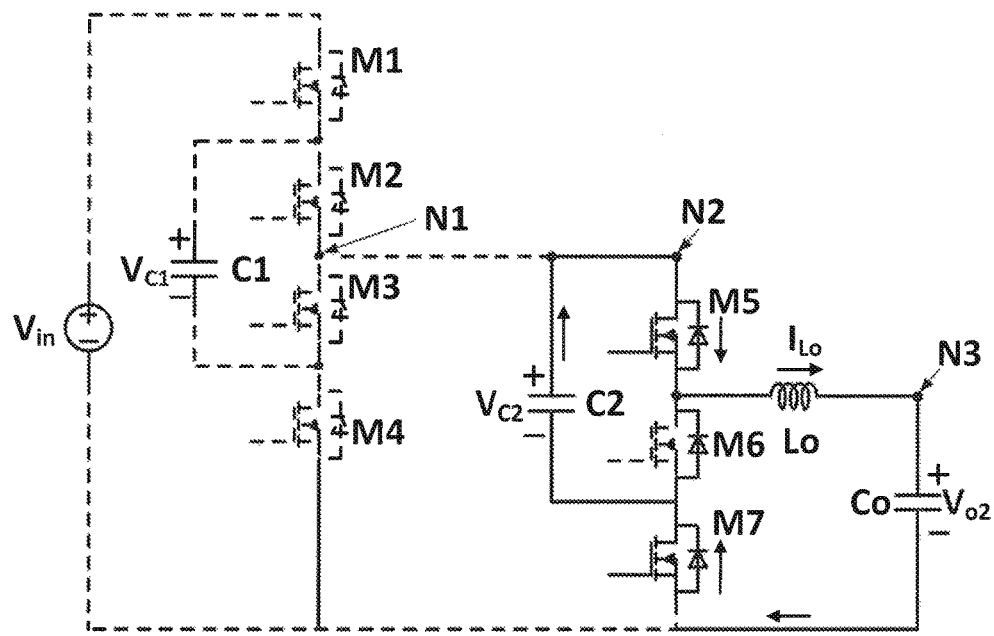

Three operating states can be identified during each switching cycle: State 1 (from t0 to t1), State 2 (from t1 to t2), and State 3 (from t2 to Ts). As noted above, FIG. 5 shows the typical waveforms of the circuit, where it is assumed that the input voltage is 48V. It is noted that the ripple voltages across C1 and C2 are usually very small (around 10 mV to 500 mV). The ripple voltages are not shown in FIG. 5. Equivalent circuits for each state are shown in FIGS. 6, 7, and 8, where the solid lines indicate devices in the on state and the dotted line indicate devices in the off state. The current direction is also shown in the figures.

State 1 (from t0 to t1, FIG. 6): M1, M3, and M6 are turned on at t=t0, which is also the starting point of the switching cycle. In this operation state, M1 and M3 in the 4S cell are on and M6 in the 3S cell is on. The current path is: Vin→M1→C1→M34→C2→M6→Lo→Load→Vin (negative terminal). The amplitude of the current is the output inductor current, which is same as the load current. The capacitors C1 and C2 are both charged by the output inductor current $I_{Lo}$. The duration of State 1 is approximately 25% of the switching cycle. During this state, the voltage at N1 is $V_{N1}$=Vin−$V_{C1}$=0.5 Vin=24V. The voltage at N2 is $V_{N2}$=Vin−$V_{C1}$−$V_{C2}$=Vin−0.5 Vin−0.5$V_{C1}$=Vin−0.5 Vin−0.25 Vin=0.25 Vin. The output voltage $V_{O2}$ equals the voltage $V_{N1}$ minus the second flying capacitor voltage $V_{C2}$. That is, $V_{O2}$=$V_{N2}$−$V_{C2}$=$V_{in}$−$V_{C1}$−$V_{C2}$=12V.

State 2 (from t1 to t2, FIG. 7): M1 and M3 are turned off at t=t1 and M2 and M4 are turned on at t=t1. In this operation state, M2, M4, and M6 are on, Capacitor C1 is discharged through M2 and M4. The current path is C1→M2→C2→M6→Lo→Co→M4→C1. The amplitude of the current is the output inductor current, which is same as the load current. C1 is discharging and C2 is charging. The duration of State 2 is approximately 25% of the switching cycle. During this state, the voltage at N1 is $V_{N1}$=$V_{C1}$=0.5 Vin=24V. The voltage at N2 is $V_{N2}$=$V_{C1}$−$V_{C2}$=0.5 Vin−0.5$V_{C1}$=0.5 Vin−0.25 Vin=0.25 Vin. The output voltage $V_{O2}$ equals the voltage $V_{N1}$ minus the second flying capacitor voltage $V_{C2}$. That is, $V_{O2}$=$V_{N1}$−$V_{C2}$=$V_{C1}$−$V_{C2}$=12 volts.

State 3 (from t2 to Ts, FIG. 8): M2, M4 and M6 are turned off at t=t2 and M5 and M7 are turned on at t=t2. In this operating state, M5 and M7 are on. Capacitor C1 is disconnected from the circuit and its current is zero. Capacitor C2 discharges through M5 and M7. The current path is: C2→M5→Lo→Co→M7→C2. The amplitude of the current is the inductor current. During this state, the voltage at N1 is $V_{C2}$ and the voltage at N2 is $V_{N2}$=$V_{C2}$=0.25 Vin as well. The output voltage $V_{O2}$ equals the second flying capacitor voltage $V_{C2}$. That is, $V_{O2}$=$V_{C2}$=12 volts.

M5 and M7 are turned off at t=Ts, the end of the switching cycle. Then the next switching cycle starts and the operation repeats.

A controller operates the on-off times of switches M1-M7 according to the timing diagram of FIG. 5 to achieve the three operating states described above to produce the expected output voltage.

It can be observed from the above analysis that the steady state voltage across capacitor C1 is half of the input voltage.

The steady state voltage across C2 is half of the voltage across C1 and therefore, a quarter of the input voltage. The output voltage is equal to $V_{C2}$. That is:

$$V_{C1}=0.5*Vin, V_{2C}=0.5*V_{C1}=0.25*Vin,$$
$$V_{OUT}=V_{O2}=V_{C2}=0.25Vin$$

An observation is that the voltage stress of the switches in the first stage (4S cell) is half of the input voltage, e.g., 24V for Vin=48V. That is, for M1 and M3, the voltage stress is Vin−$V_{C1}$=0.5 Vin, and for M2 and M4, the voltage stress is $V_{C1}$=0.5 Vin. The voltage stress for the second stage (3S cell) is even lower, at 0.25V. That is, the voltage stress of M5 and M6 is $V_{C2}$=0.25 Vin, and the voltage stress of M7 is $V_{C1}$−$V_{C2}$=0.5 Vin−0.25 Vin=0.25 Vin. Lower voltage stress MOSFETs exhibit better performance and greater reliability, which is very desirable.

The above advantages result in a power converter that is significantly smaller in size and achieves higher efficiency than prior power converter designs.

It is noted that the output voltage is not controlled. Instead, in an ideal case (where no loss is considered), the output voltage is equal to one quarter of the input voltage. In a practical implementation, the output voltage is slightly lower than one quarter of the input voltage. This feature simplifies the control circuit design and increases the robustness of the converter.

Figure 10:
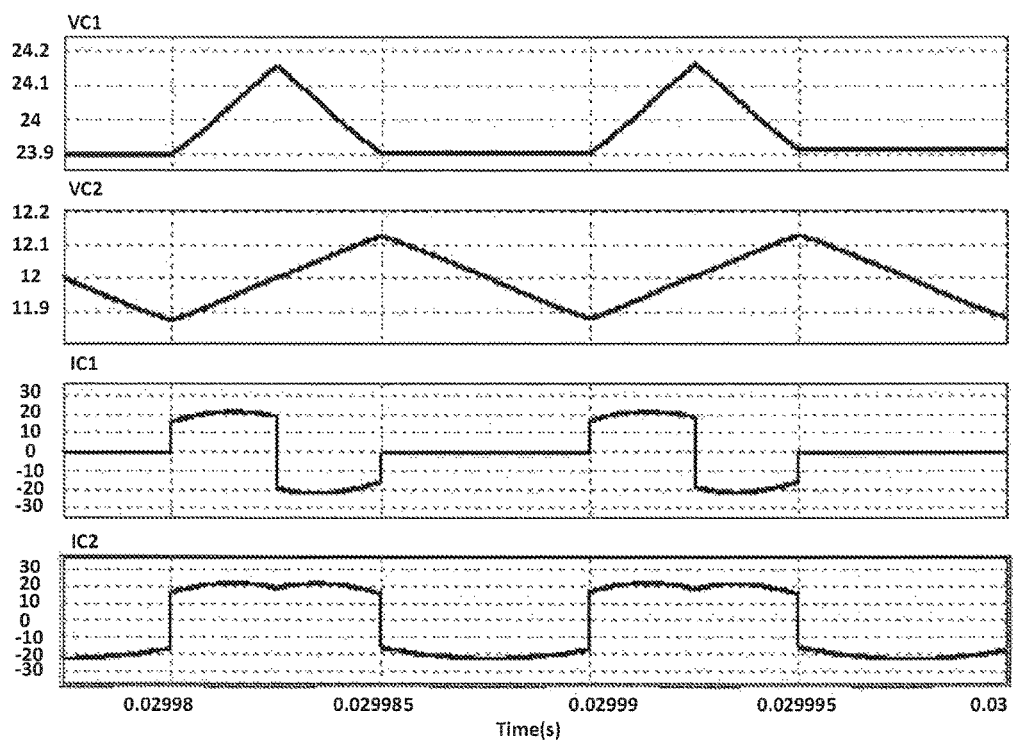
Figure 11:
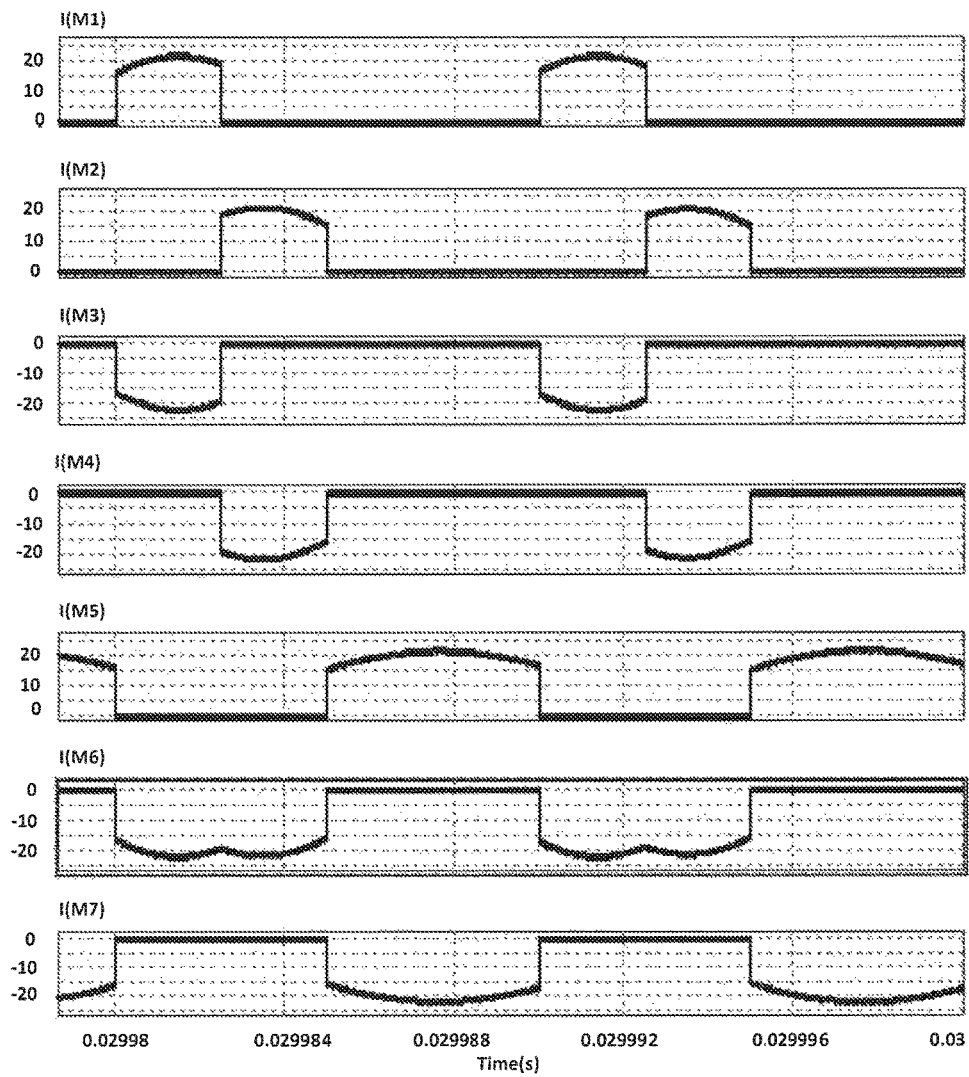
Figure 12:
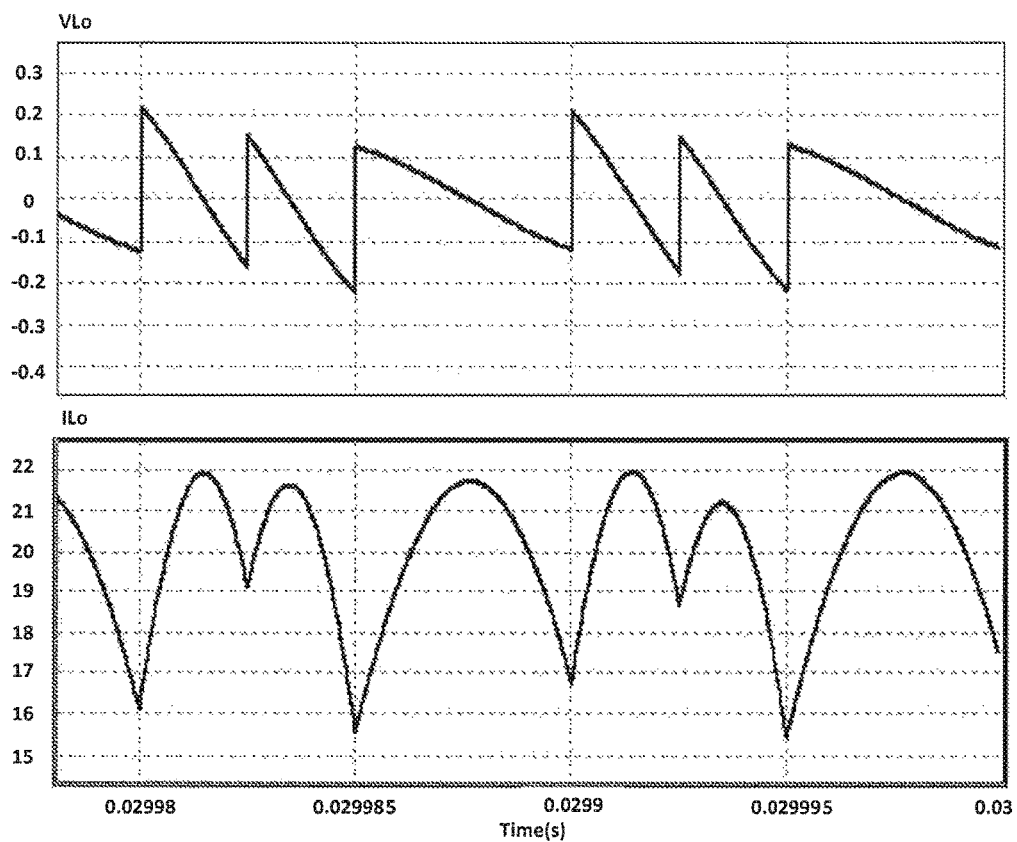

The waveforms of FIG. 10, FIG. 11, and FIG. 12 show simulation results for the converter of FIG. 4 with input voltage of 48V, output voltage of 12V, and load current of 20 A. In the simulation, the switching frequency is 100 KHz. The inductor value is 30 nH. Other parameters are: C1=200 µF, C2=400 µF, and Co=500 µF. The simulation was performed using PSIM™ (Powersim Inc., Rockville, Md., U.S.A.).

FIG. 10 shows the simulated waveforms of the capacitor voltage $V_{C1}$ (top), $V_{C2}$ (second from the top), which are the ripple voltages across C1 and C2, and capacitor current $I_{C1}$ (third from top) and $I_{C2}$ (bottom). FIG. 11 shows the simulated current waveforms of all the switches. The waveforms from top to bottom are: I(M1), I(M2), I(M3), I(M4), I(M5), I(M6), and I(M7). FIG. 12 shows the simulated inductor voltage (top) and inductor current (bottom) waveforms.

One observation from the above analysis based on Vin=48V is that the voltage at N2 is always at 12V DC, with a small ripple, as shown in FIG. 5. The AC component of $V_{N2}$ depends on the ripple voltage of capacitors C1 and C2, which is very small. Therefore, a very small inductor value can be used to filter out this small ripple voltage. The voltage across the inductor Lo is shown in FIG. 12 (top waveform). It is noted that the peak to peak inductor voltage is approximately 0.4V. It is noted that for a Buck converter that converts 48V to 12V, the peak to peak inductor voltage will be 48V. However, according to the embodiments described herein, the output inductance value can be reduced by at least 100 times as compared with a Buck converter. This significantly reduces the inductor size.

In addition, it is observed from the simulation waveforms (in FIG. 12) that the frequency of the inductor voltage is several times higher than the switching frequency, which means that a smaller filter capacitor, Co, is needed to achieve same output ripple voltage.

During operation of the converter, the switches (i.e., M1 to M7) operate at low switching frequency, e.g., from tens of KHz to 100 KHz, to reduce switching loss. The switching frequency of a load DC-DC converter is independent of the switching frequency of the converter. The switching frequency of the load DC-DC converter can be high, e.g., from hundreds of KHz to several MHz.

Figure 9:
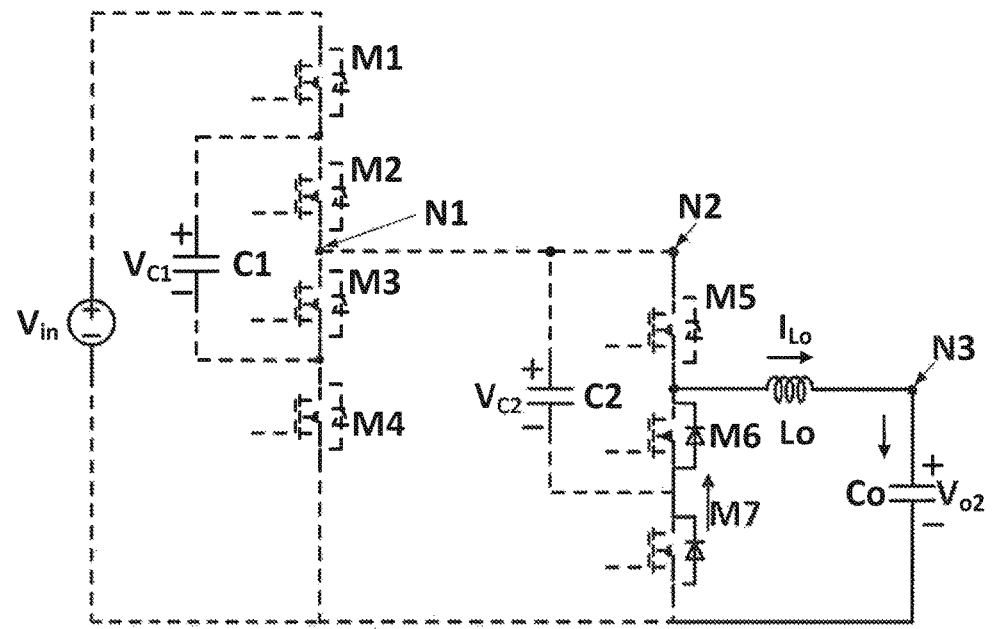
FIG. 9 is an equivalent circuit for the two-stage DC-DC step-down converter of FIG. 4 during a dead time operating mode.

In another embodiment, a dead time may be added between one or more of the switching transitions. Such an embodiment may be advantageous in certain practical applications. For example, a dead time operating mode as shown in the embodiment of FIG. 9 may be employed during the transition of the three operating states to avoid the shoot through of power sources. The duration of the first operating state and the duration of the second operating state are both a quarter of one switching cycle Ts, and the duration of the third operating state is one half of Ts. In this way, the voltage $V_{C1}$ equals half of V and $V_{C2}$ equals half of $V_{C1}$ in the embodiment.

Additional 3S cells may be added after the first 3S cell so that lower output voltage can be produced.

Design Consideration

As shown in the analysis above, a multi-stage DC-DC step-down converter according to the embodiments can reduce voltage stress on switches and reduce the value of the filter inductor as compared with a conventional Buck converter because the flying capacitor blocks half of the input voltage in each stage. This should be taken into design consideration when selecting the flying capacitor voltage rating.

The flying capacitors are charged and discharged for the same amount of time. The selection of the capacitance value of the flying capacitors should be such that the voltage ripple of the flying capacitors is much smaller than the DC voltage of flying capacitors. In this way, the output of each stage may be considered to be a DC voltage. The voltage and current waveforms of the flying capacitors are shown in FIG. 10, as obtained by computer simulation.

The current waveforms of switches M1-M7 are shown in FIG. 11. The duration of the first operating state or the second operating state are both a quarter of one switching cycle Ts.

The duration of the third operating state is one half of Ts. In this way, the average current in the switches of stage 1 (4S cell), M1, M2, M3, M4, is a quarter of the output current $i_o$ of the second stage, which is 20 A in the example waveforms. The average current in the switches of stage 2 (3S cell), M5, M6, M7, is half of $i_o$.

The current and voltage waveforms of inductor Lo are shown in FIG. 12. The average current in inductor Lo is $i_o$. It is noted that the inductor voltage is about 0.4V (peak to peak), which is very small for a 48V to 12V power converter. Therefore, the inductor current ripple is about 6 A (peak to peak) with an inductor value of only 30 nH, which is a very small value.

Figure 13:
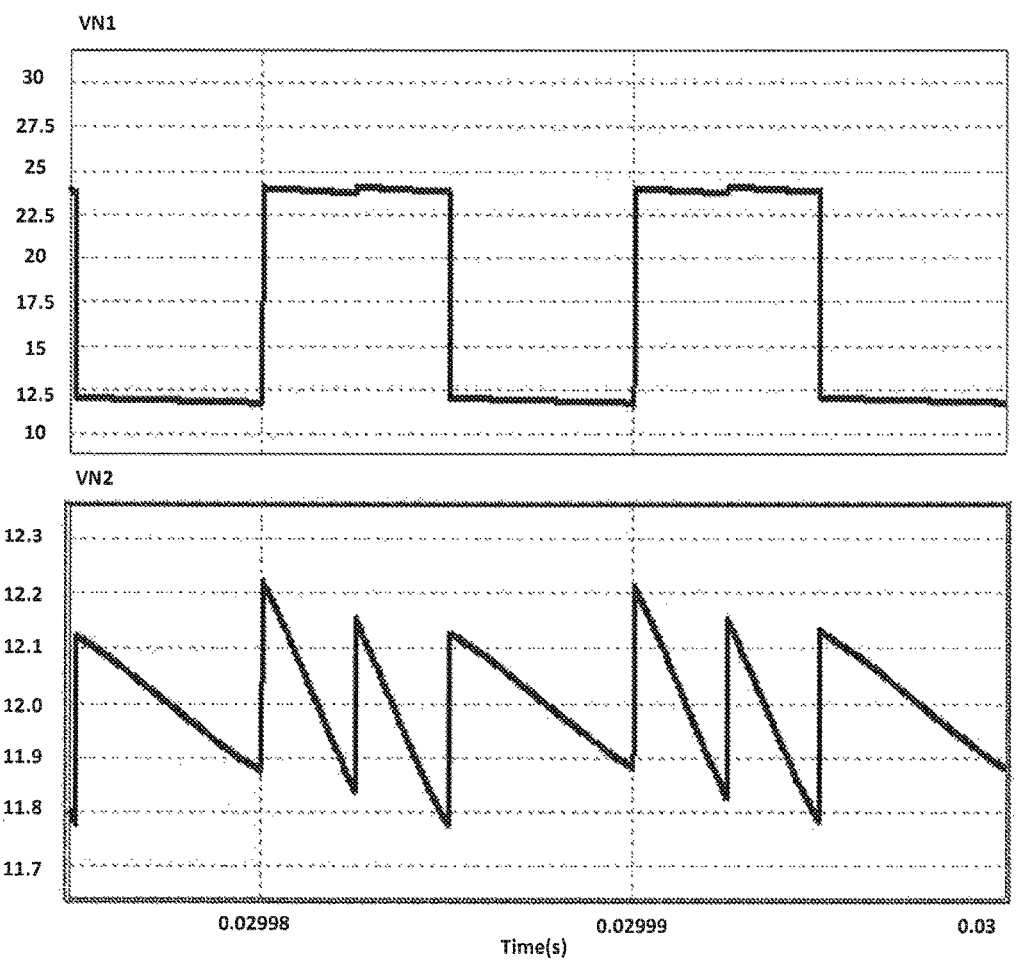
FIG. 13 shows simulated voltage waveforms at nodes N1 and N2 (upper and lower panels, respectively) for the embodiment of FIG. 4.

The voltage waveforms at node N1 and N2 are shown in FIG. 13 upper and lower panels, respectively. The voltage at N1 alternates between 12V and 24V. The voltage at N2 is 12V DC plus small voltage ripple.

Figure 14:
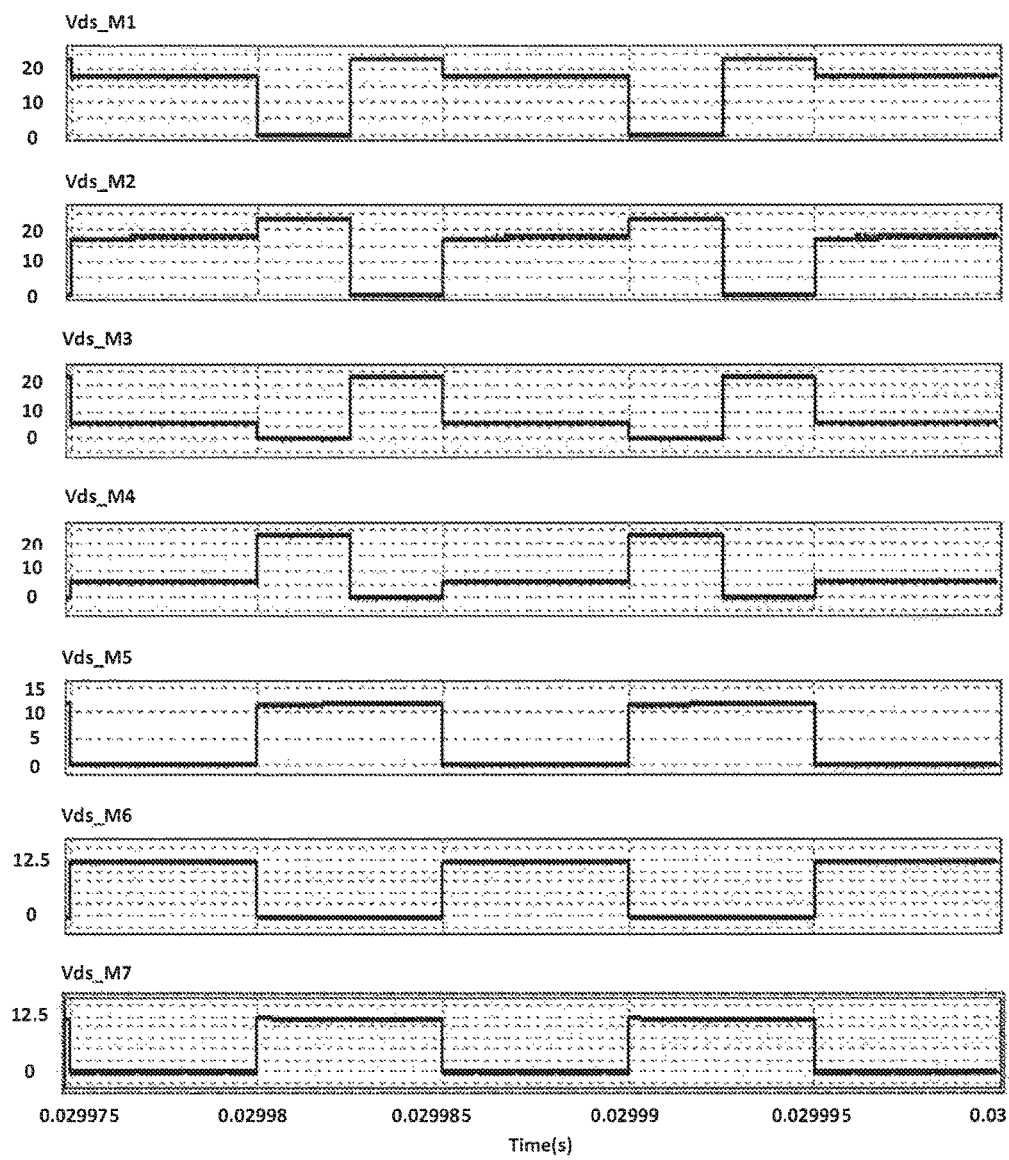
FIG. 14 shows simulated drain to source voltage waveforms for each switch (M1-M7) of the embodiment of FIG. 4, wherein the waveforms (from top to bottom) are Vds_M1, Vds_M2, Vds_M3, Vds_M4, Vds_M5, Vds_M6, and Vds_M7.

FIG. 14 shows the drain to source voltage of each switch (M1-M7). The waveforms from top to bottom are: Vds_M1, Vds_M2, Vds_M3, Vds_M4, Vds_M5, Vds_M6, and Vds_M7. These waveforms show that the voltage stress for the first stage (4S cell) is half of the input voltage (24V) and the voltage stress of the second stage (3S cell) is the output voltage (12V).

Figure 15:
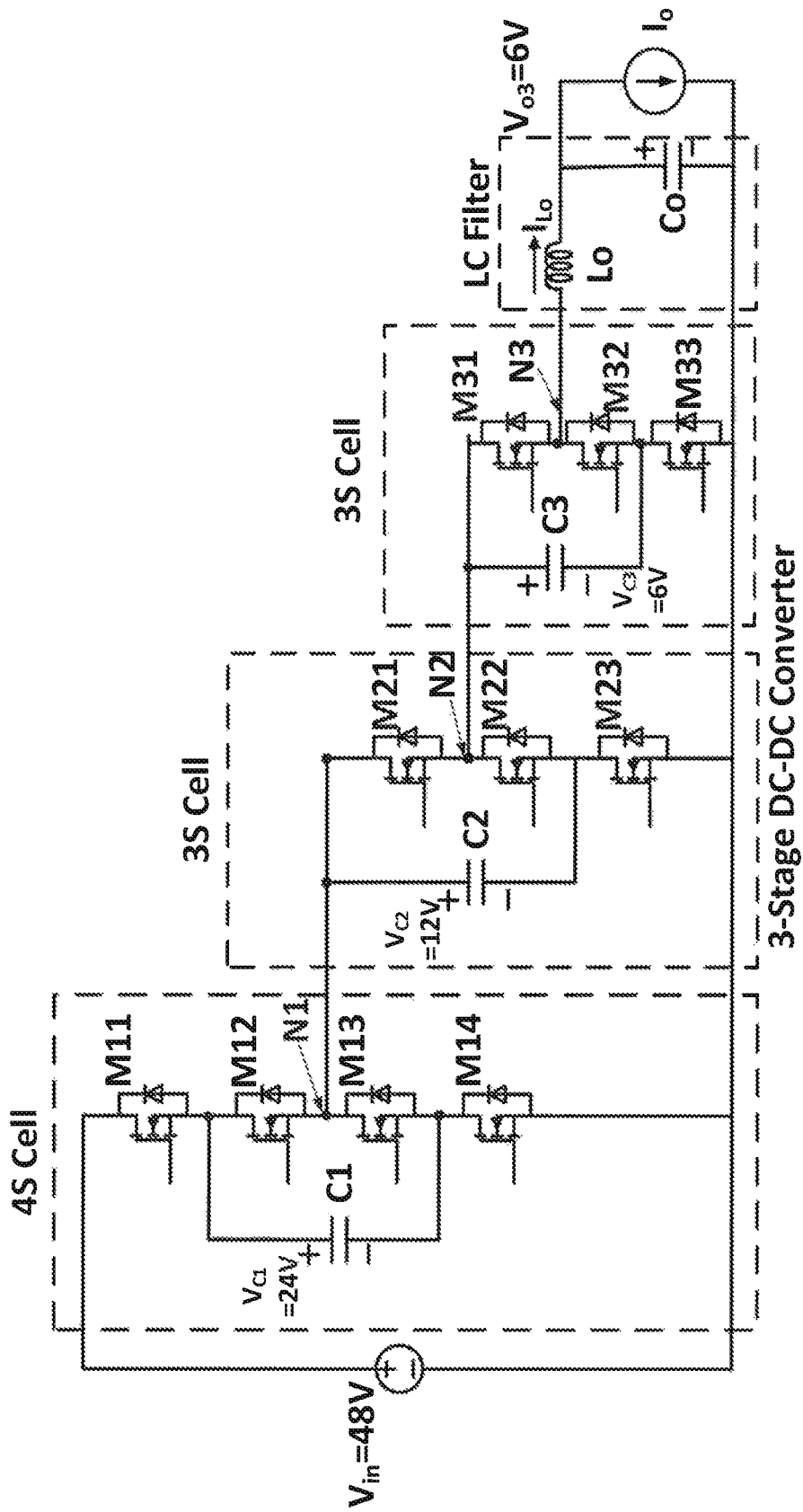
FIG. 15 is a diagram of a three stage DC-DC converter, including one 4S cell and two 3S cells, according to one embodiment.

FIG. 15 shows a three stage DC-DC converter. In this embodiment, one 4S cell and two 3S cells are used. The input of the second 3S cell is connected to the output of the first 3S cell. The LC filter is connected to the output of the second 3S cell. The output voltage is $48V/2^3=48V/8=6V$. In this embodiment, the duty cycle for the first stage (4S cell, switches M11, M12, M13, and M14) is 12.5%. The duty cycle for the second stage (the first 3S cell, switches M21, M22, and M23) is 25% and the duty cycle for the third stage (the second 3S cell, M31, M32, M33) is 50%.

Additional stages may be added in similar way to generate a larger voltage conversion ratio.

Extension of 4S Cell

Figure 16:
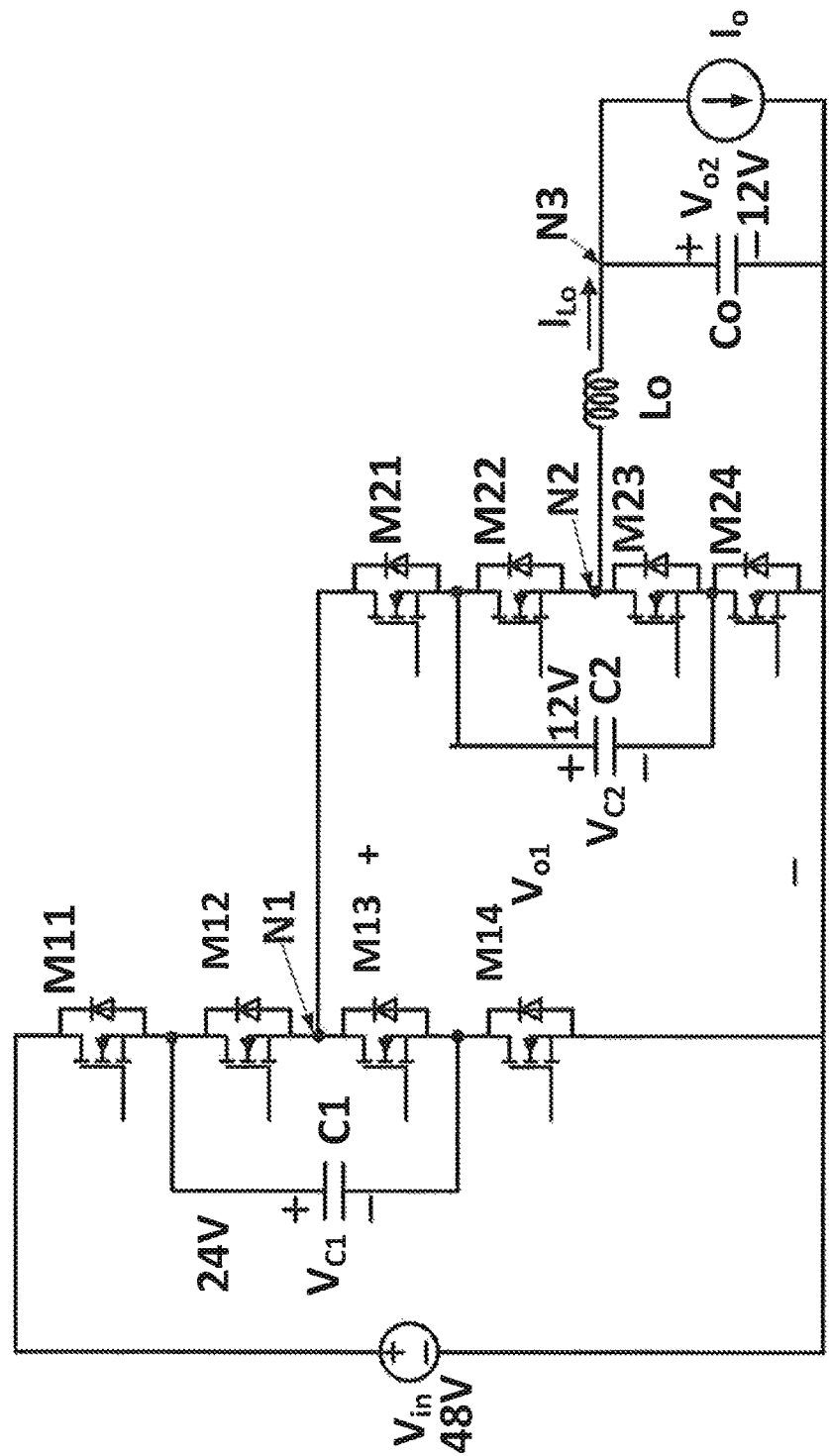
FIG. 16 is a diagram of a two-stage DC-DC converter using two 4S cells connected in cascade, according to one embodiment.

In another embodiment, only 4S cells are used. For example, FIG. 16 shows a two-stage DC-DC converter using two 4S cells connected in cascade. In this embodiment, the duty cycle of the first stage 4S cell is 25% (for M11, M12, M13 and M14) and the duty cycle for the second stage 4S cell is 50% (for M21, M22, M23 and M24). The gate drive signals for M11, M12, M13, and M14 are same as those of M1-M4, shown in FIG. 5. The gate drive signal of M21 and M23 are same as the gate drive signal of M6, as shown in FIG. 5. The gate drive signals of M22, M24 are same as the gate drive signals of M5 and M7, as shown in FIG. 5. Although the circuit shown in FIG. 16 can achieve the same performance as the circuit shown in FIG. 4, this embodiment requires one more MOSFET. In addition, the conduction loss and switching loss is also increased relative to the embodiment of FIG. 4, due to M21. However, the embodiment shown in FIG. 16 can produce 12V from 48V with high efficiency and small size, as the inductor, Lo, is also very small. If the input voltage is 48V, the voltage across the flying capacitor C1 is 24V (half of Vin) and the voltage across the flying capacitor C2 is 12V (a quarter of Vin). In a further embodiment, three stages (using three 4S cells) may be employed. Since the strategy is the same, the details are not discussed here.

SUMMARY

For multi-stage multilevel DC-DC step-down converter embodiments with 4S cells and 3S cells connected in cascade, advantages include lower inductance value and lower voltage stress for the switches. As a result, all the switches can be operated at lower frequency as compared with a conventional Buck converter to achieve low ripple current. Therefore, the switching losses can be significantly reduced the efficiency and power density can be increased, as compared to conventional one-stage DC-DC step-down converters.

When gate signals of the switches in the embodiment shown in FIG. 4 are controlled by the gate according to the scheme of FIG. 5 (top four waveforms, the following are observed:

The DC voltage value at node N2 ($V_{N2}$) is equal to ¼(one quarter) of the input voltage and the DC voltage value at node N3 ($V_{N3}$), is also equal to ¼(one quarter) of the input voltage. The voltage at N3 is the output voltage; both $V_{N2}$ and $V_{N3}$ are DC voltages with small ripple (not shown in FIG. 5).

For an input voltage of 48V, and duty cycles for M1, M2, M3, and M4 of 25% and duty cycles for M5, M6, and M7 of 50%, as shown in FIG. 5, the DC voltage at N2 is $V_{N2}$=12V and the DC voltage at node N3 is also $V_{N3}$=12V.

Figure 17:
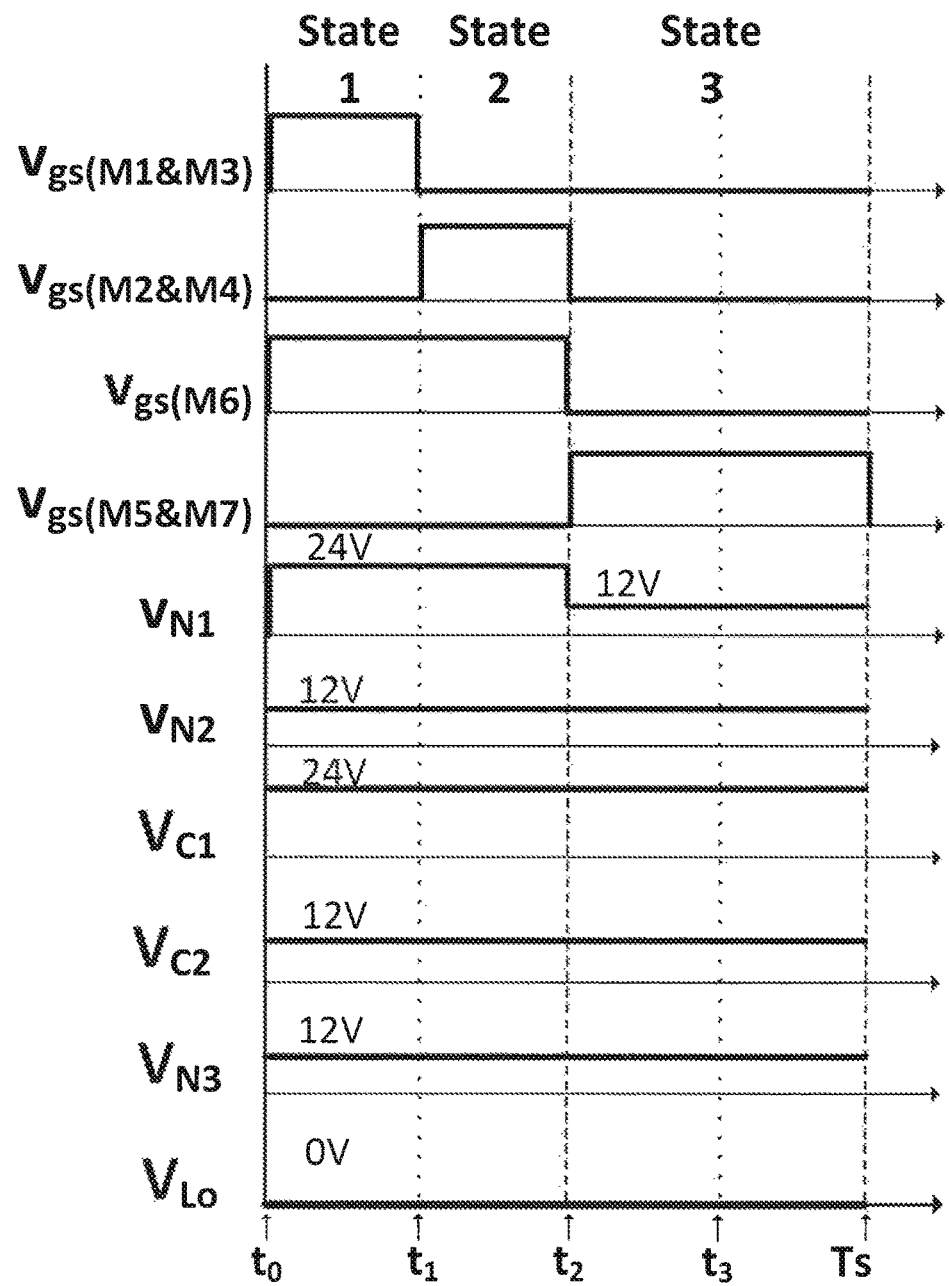
FIG. 17 is a timing diagram for the embodiment of FIG. 4, where it can be seen that the instantaneous voltage across the inductor Lo is zero all the time, as shown in FIG. 17 the bottom waveform.

Therefore, the instantaneous voltage across the inductor Lo (in FIG. 4) is zero all the time, as shown in FIG. 17, bottom waveform.

In conventional DC-DC circuits, the average value of the inductor voltage over one switching cycle is zero at steady state. However, with a circuit topology according to embodiments described herein, such as shown in FIG. 4, and the gate drive signals such as shown in FIG.

5, the instantaneous inductor voltage is zero all the time. This is a significant advantage over conventional switching converters, such as a Buck converter, where the instantaneous inductor voltage is dependent on the DC value of the input voltage and/or the DC value of the output voltage. For example, for a Buck converter (as shown in FIG. 1), when the control switch (A1) is on, the instantaneous inductor voltage is the difference between the input voltage and the output voltage, and when the control switch (A1) is off, the instantaneous inductor voltage is the negative output voltage.

In a practical implementation, there is a small voltage ripple at $V_{N2}$ and $V_{N3}$, therefore, a small voltage that is dependent on the ripple voltage of $V_{N2}$ and $V_{N3}$ will appear across the instantaneous inductor voltage. The bottom waveform of FIG. 13 shows a simulated waveform of $V_{N2}$. The simulated waveform shows that the average DC value of $V_{N2}$ is 12V and the peak ripple voltage value is about 0.2V. The top waveform of FIG. 12 shows a simulated inductor voltage waveform when $V_{N2}$ and $V_{N3}$ have voltage ripple. It is noted that the peak inductor voltage is about 0.2V, which is much smaller than the input voltage (48V) and output voltage (12V) in this simulation. It can also be shown both by simulation and analysis that if the capacitor values of C1, C2, and C3 are increased, the peak inductor voltage will be reduced to a smaller value.

In the embodiment of FIG. 4 and the control signals shown in FIG. 5, the output voltage is ¼of the input voltage for different inductance values and for different capacitance (C1, C2, and Co) values. Under the condition that C1, C2, and Co values are large enough (in other words, the ripple voltage is always much smaller than the DC voltage), different capacitor and inductor values will only change the instantaneous inductor voltage and the inductor current ripple. They will not impact the operation of the converter, nor the output voltage DC value. This is a significant advantage that simplifies the design of zero inductor voltage DC-DC converter embodiments.

Figure 18:
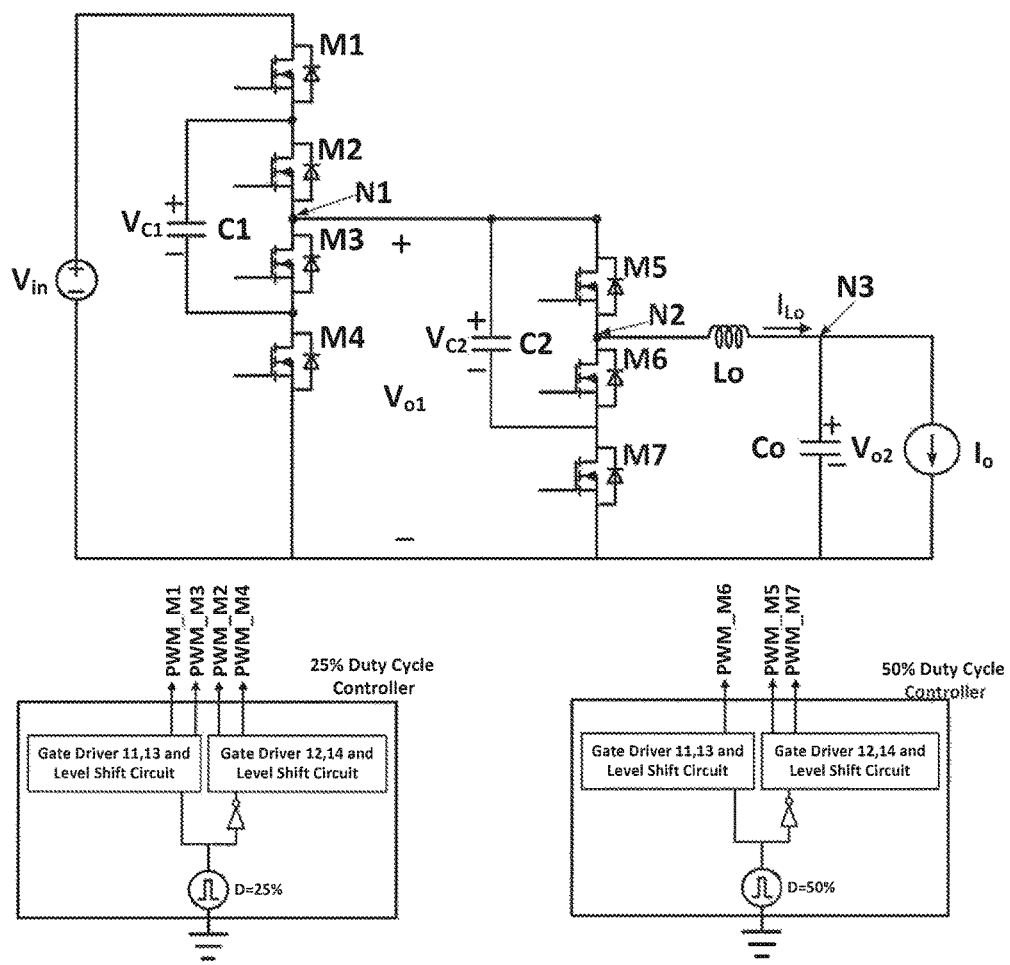
FIG. 18 is a diagram of a two stage zero inductor voltage DC-DC converter with a voltage transfer ratio of 1/4, according to one embodiment.
Figure 19:
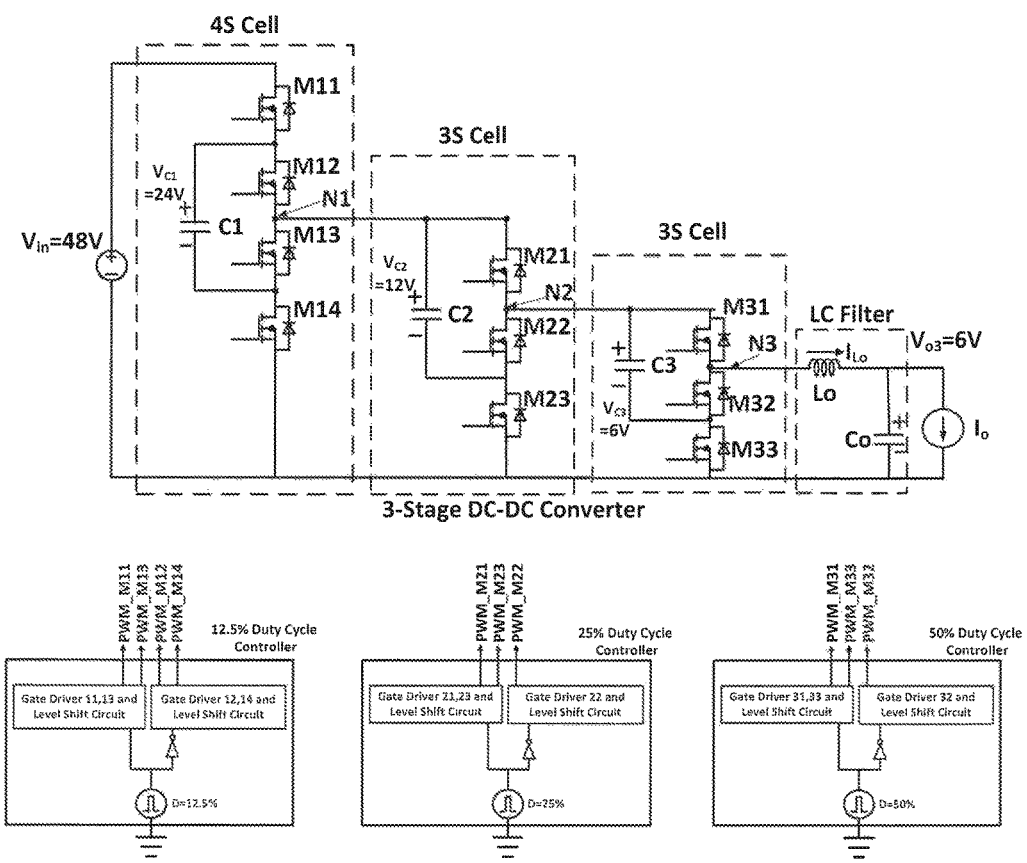
FIG. 19 is a diagram of a three stage zero inductor voltage DC-DC converter with a voltage transfer ratio of 1/8, according to one embodiment.

Multi-stage zero inductor voltage DC-DC converters may be implemented by combining a topology based on that shown in FIG. 4 and a fixed duty cycle control scheme based on that shown in FIG. 5. FIG. 18 shows an embodiment including a fixed duty cycle controller. Similarly, based on the embodiment shown in FIG. 15 and a fixed duty cycle controller, a three stage zero inductor voltage DC-DC converter with a voltage transfer ratio of 1/8 may be implemented, as shown in FIG. 19.

The controller may be implemented in any suitable technology. The controller may include logic gates and devices such as, for example, a counter or a flip-flop, and may include a clock from which a selected switching frequency may be derived. The controller may include a level shift circuit for turning on and turning off the high side MOSFETs, such as M11, M12, M13, etc. A device such as a field programmable gate array (FPGA) or a complex programmable logic device (CPLD) may also be used. The controller produces the gating (i.e., switching) signals for the switches at the desired switching frequency and duty cycle.

Zero Inductor Voltage Three Level Converter

Another implementation of a zero inductor voltage three level DC-DC converter is described with reference to FIG. 20, together with a 50% duty cycle controller.

Figure 20:
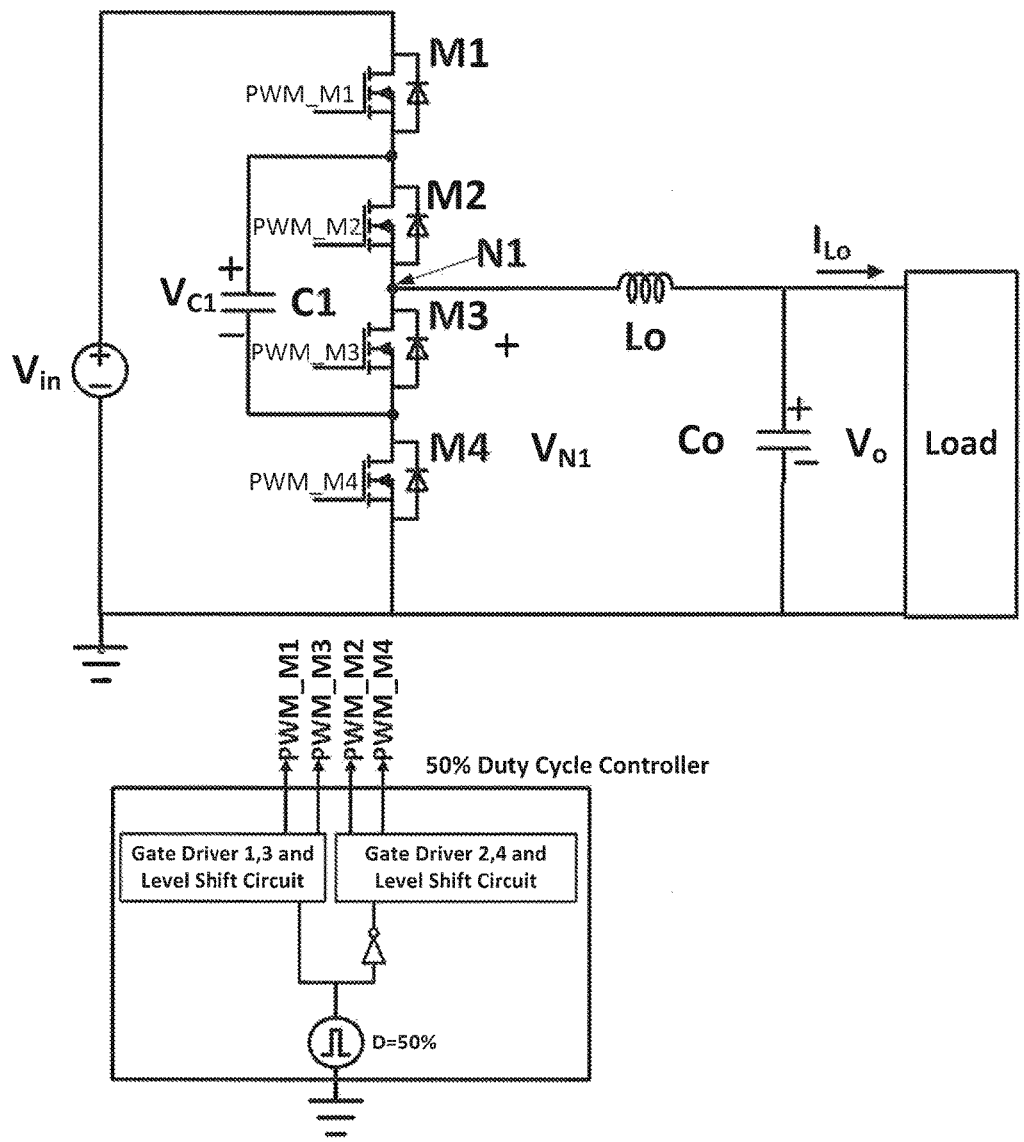
FIG. 20 is a diagram of a single-stage three-level step-down converter including a 4S cell, an LC filter, and a 50% duty cycle controller.

As shown in FIG. 20, the single-stage three-level step-down converter comprises a 4S cell (including M1, M2, M3, M4, and C1) and an LC filter. The 50% duty cycle controller with level shift circuit is employed to drive switches M1, M2, M3, and M4. The gate drive signals of M1 and M3 are same and they are on for the first 50% of the switching cycle. The gate drive signals of M2 and M4 are same and they are on for the second 50% of the switching cycle. In this control scheme, the conversion ratio is constant 2:1 (i.e., Vout/Vin=0.5). The inductor Lo is used as a buffer for the voltage ripple difference between node N1 and the output. Operation is described as follows:

State 1: In the first 50% of the switching cycle, switches M1 and M3 are on. The current path is: Vin→M1→C1→M3→Lo→Co→Vin. The capacitor C1 is charged by the inductor current ILo. During this period, the voltage at N1 is $V_{N1}$=Vin−$V_{C1}$=0.5 Vin. The output voltage is 0.5 Vin as well. Therefore, the voltage difference on the Inductor Lo is only related to the voltage ripple of Vin, Vc1, and Vout. The DC voltage of Vin and Vout do not affect the inductor current.

State 2: In the second 50% of the switching cycle, switches M2 and M4 are on. The current path is: C1→M2→Lo→Co→M4→C1. The capacitor C1 is discharged by the inductor current ILo. During this period, the voltage at N1 is $V_{N1}$=$V_{C1}$=0.5 Vin. The output voltage is 0.5 Vin as well. Therefore, the voltage difference on the inductor Lo is only related to the voltage ripple of Vin, Vc1, and Vout. The DC voltage of Vin and Vout do not affect the inductor current.

Figure 21:
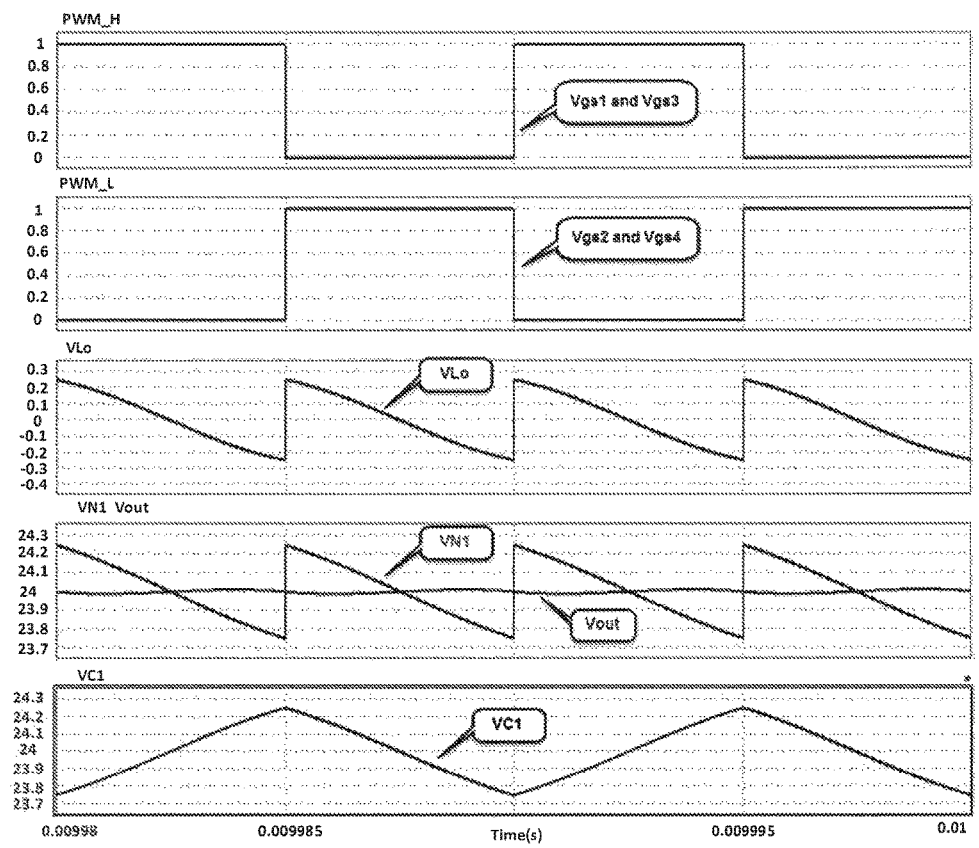
FIG. 21 shows simulation waveforms for the embodiment of FIG. 20, wherein the waveforms are (top to bottom) the gate drive signal for M1 and M3 (Vgs1 and Vgs3), the gate drive signal for M2 and M4 (Vgs2 and Vgs4), the inductor voltage waveform (VLo), the voltage at node N1 (VN1) and the output voltage (Vout), and the capacitor voltage VC1.

A simulation was performed using PSIM and the following parameters: Fs=100 KHz, C1=100 µF, Lo=100 nH, Co=100 µF, Vin=48V, duty cycle D=50% (fixed), and Vout=24V. FIG. 21 shows the simulation waveforms. The top waveform is the gate drive signal for M1 and M3 (Vgs1 and Vgs3). The second waveform from the top is the gate drive signal for M2 and M4 (Vgs2 and Vgs4). The third waveform from the top is the inductor voltage waveform (VLo). The fourth waveform from the top is the voltage at node N1 (VN1) and the output voltage (Vout). The bottom waveform is the capacitor voltage VC1. It can be observed that the peak inductor voltage is about 0.25V, which is the same as the peak ripple voltage of capacitor C1. Again, the value of C1, Co, and Lo will not change the voltage gain of the converter (or output voltage value of 24V). The results confirm that the inductor current ripple is only related to voltage ripples of Vin, Vout, and Vc1.

It is also noted that in this embodiment, the values of the capacitors C1, Co and the inductor Lo do not impact the output voltage and input voltage relationship. The output voltage is always half of the input voltage. The value of C1, Co will impact the inductor voltage ripple.

Zero Inductor Voltage Two Stage Three Level Converter

The embodiment of FIG. 20 provides an output voltage that is half of the input voltage.

Figure 22:
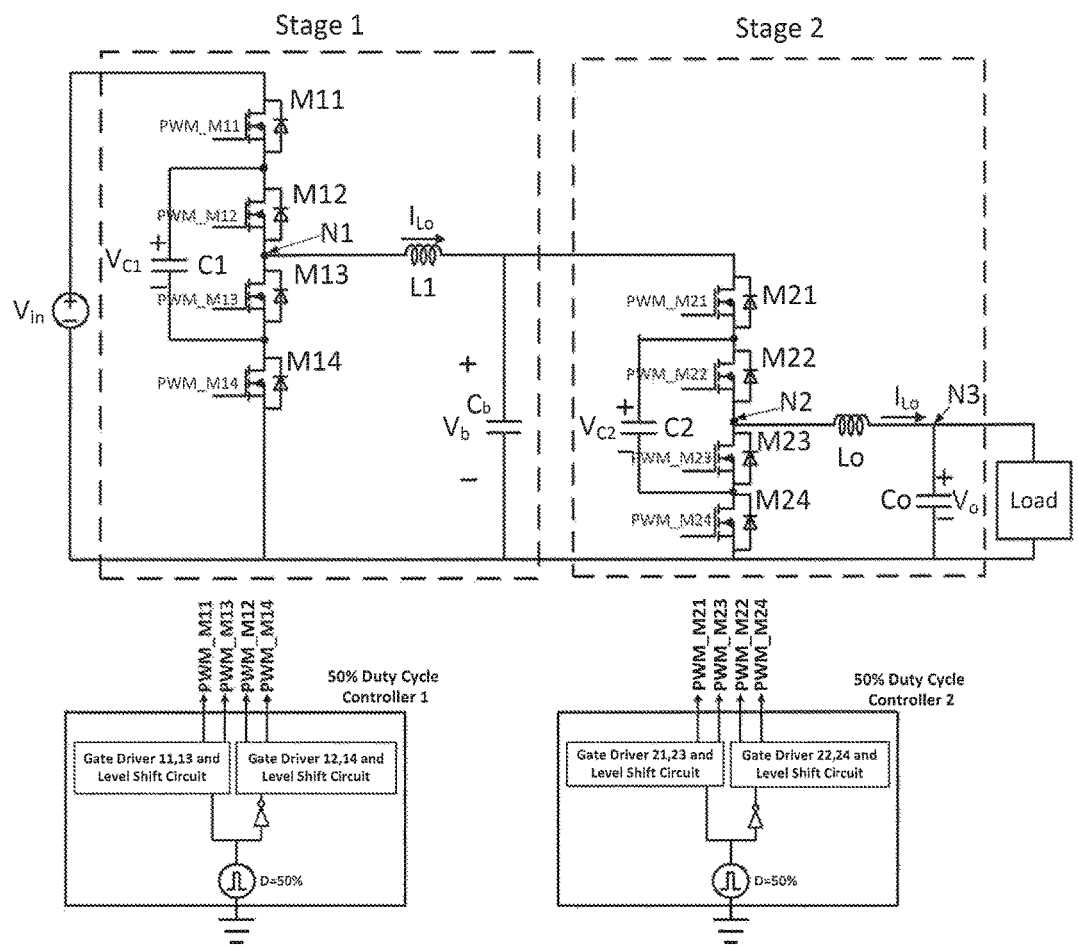
FIG. 22 shows an embodiment wherein two zero inductor voltage three level converters are connected in series in cascade mode to achieve a four times voltage step down ratio, including two 4s cells and two LC filters, and 50% duty cycle controllers.

If two of these circuits are cascaded, i.e., connected together in series, as shown in FIG. 22, the output voltage (e.g., at node N3) will be ¼of the input voltage. The voltage at Cb (VCb) will be half of the Input voltage. The duty cycle for all eight switches is 50%. Similarly, the instantaneous voltages across L1 and Lo are dependent on the ripple voltage of C1, Cb, and C2, Co. They are not dependent on the DC input voltage and DC output voltage.

As shown in FIG. 22, two zero inductor voltage three level converters are connected in series in cascade mode in order to achieve four times voltage step down ratio. This embodiment includes two 4s cells and two LC filters. A 50% duty cycle controller is employed to drive switches M11, M12, M13, M14. The gate drive signals of M11 and M13 are same and they are on for the first 50% of the switching cycle.

The gate drive signals of M12 and M14 are same and they are on for the second 50% of the switching cycle. Another 50% duty cycle controller is employed to drive switches M21, M22, M23, M24. The gate drive signals of M21 and M23 are same and they are on for the first 50% of the switching cycle. The gate drive signals of M22 and M14 are same and they are on for the second 50% of the switching cycle. In this control scheme, the conversion ratio is constant 4:1 (i.e., Vout/Vin=0.25). For example, if the Input voltage is 48V, the output voltage will be 12V. The inductor L1 and Lo are used to buffer the voltage ripple difference between Vin and Vb, Vb, and Vout.

Operation of the first three-level converter is as follows:

State 1: In the first 50% of the switching cycle, switches M11 and M13 are on. The current path is: Vin→M11→C1→M13→L1→Cb. The capacitor C1 is charged by the inductor current IL1. During this period, the voltage at N1 is $V_b$=Vin−$V_{C1}$=0.5 Vin. The output voltage is 0.5 Vin as well. Therefore, the voltage difference on the inductor L1 is only related to the voltage ripple of Vin, Vc1 and Vb.

State 2: In the second 50% of the switching cycle, switches M12 and M14 are on. The current path is: M14C1→M12→L1→Cb→M14→C1. The capacitor C1 is discharged by the inductor current IL1. During this period, the voltage at N1 is $V_{N1}$=$V_{C1}$=0.5 Vin. The output voltage is 0.5 Vin as well. Therefore, the voltage difference on the inductor L1 is only related to the voltage ripple of Vin, Vc1 and Vb.

Operation of the second three-level converter is as follows:

State 1: In the first 50% of the switching cycle, switches M21 and M23 are on. The current path is: Cb→M21→C2→M23→Lo→Co→Cb. The capacitor C2 is charged by the inductor current ILo. During this period, the voltage at N2 is VN2=Vb−$V_{C2}$=0.5 Vin−0.25 Vin=0.25 Vin. The output voltage is 0.25 Vin as well. Therefore, the voltage difference on the inductor L1 is only related to the voltage ripple of Vb, $V_{C2}$ and Vout.

State 2: In the second 50% of the switching cycle, switches M22 and M24 are on. The current path is: M24→C2→M22→Lo→Co→M24→C2. The capacitor C2 is discharged by the inductor current ILo. During this period, the voltage at N2 is $V_{N2}$=$V_{C2}$=0.25 Vin. The output voltage is 0.25 Vin as well. Therefore, the voltage difference on the inductor L2 is only related to the voltage ripple of Vb, Vc2 and Vout.

Therefore, the voltage difference on the two inductors L1 and Lo is only related to the voltage ripple of Vin, Vc1, Vc2, and Vout. The DC voltage of Vin and Vout do not affect the inductor current for the fixed 50% duty cycle operation.

It is noted that the duty cycle of all the switches is 50%. The switching frequency of the first stage (Fs1) and the second stage (Fs2) may be the same or different. In some embodiments, it is preferred that these two frequencies are different to achieve an optimized design.

It is also noted that if the two switching frequencies (Fs1 and Fs2) are selected to be same, the phase difference between the first stage and the second stage may be selected to be the same or to be different to achieve better performance, such as lower inductor voltage ripple, or lower capacitor voltage ripple to optimize the complete design.

Dead Time Consideration

In the above analyses, it is assumed that no dead time is present between turning off the top switch and turning on the bottom switch (e.g., M1 and M4, respectively, in a 4S cell, or e.g., M5 and M7, respectively, in a 3S cell). In a practical implementation, dead time may be introduced to avoid the possible shoot through between the top switch and bottom switch. However, it is advantageous to control the dead time to be as small as possible in order to maintain high efficiency operation. During the dead time, the body diode of a MOSFET is on and the voltage drop is higher, which causes higher loss.

Figure 23:
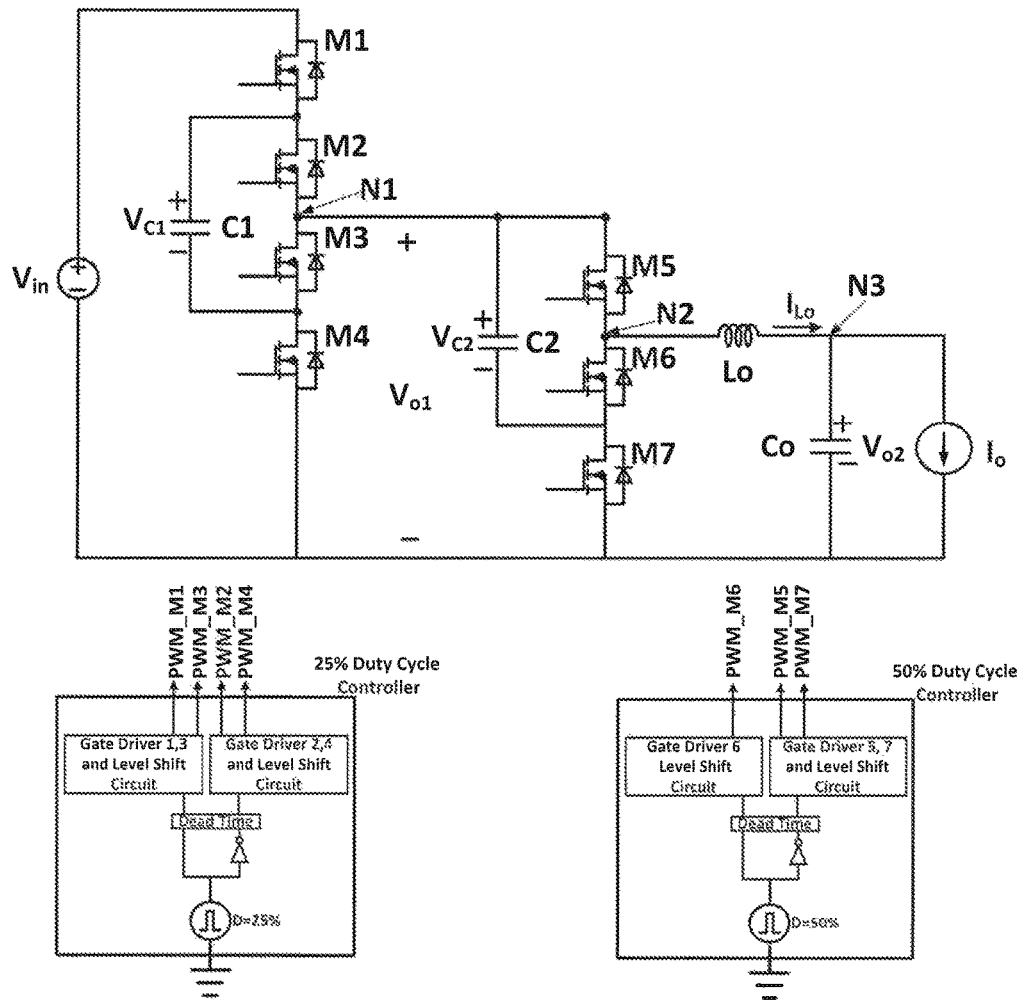
FIG. 23 is a diagram of a zero inductor voltage seven switch converter (e.g., as in FIG. 4) and a fixed duty cycle controller including a dead time control circuit.
Figure 24:
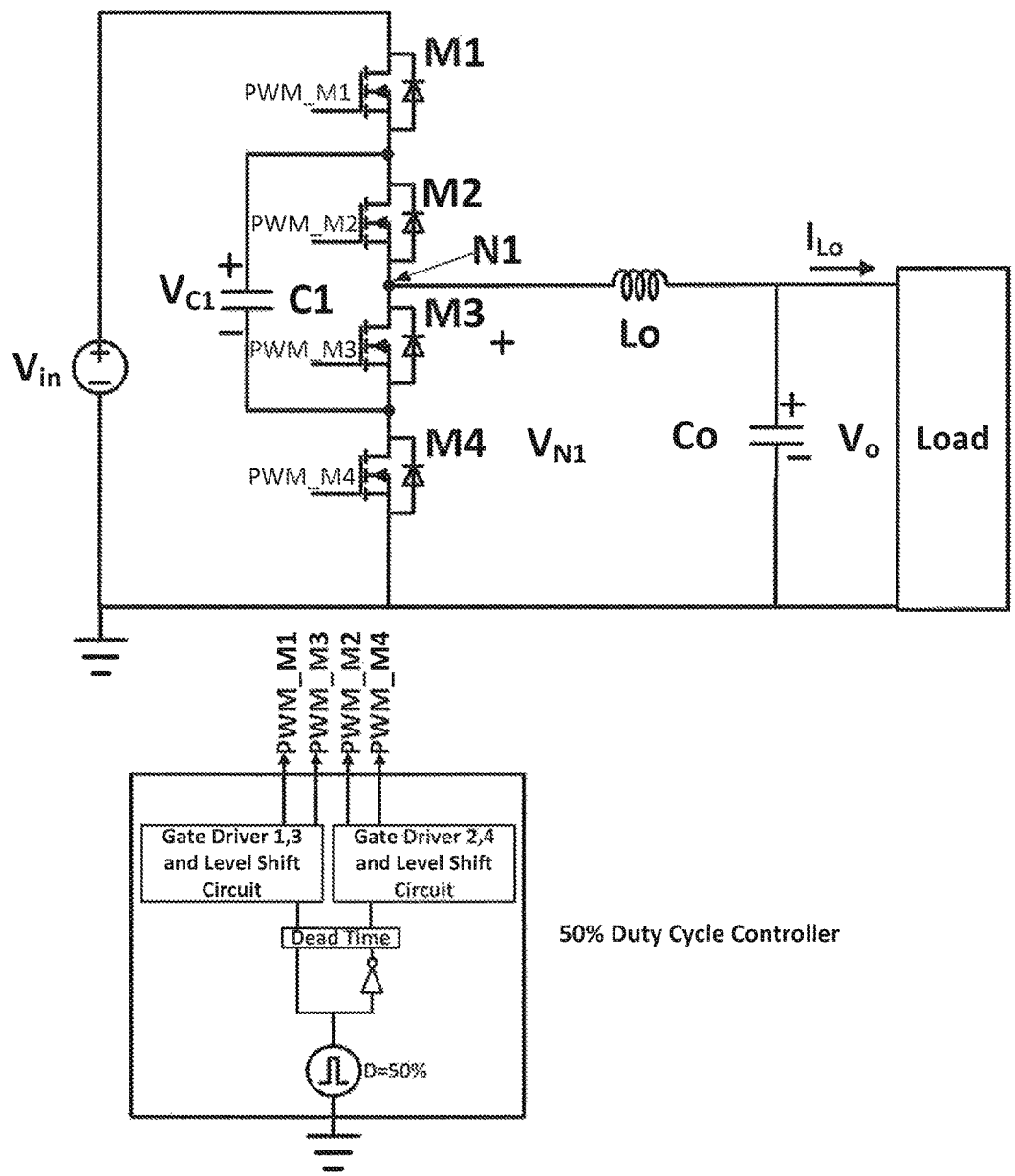
FIG. 24 is a diagram of a zero inductor voltage three level converter as in FIG. 20, with a 50% fixed duty cycle controller including a dead time control circuit.

FIG. 23 shows a zero inductor voltage seven switch converter (i.e., as in FIG. 4, which may be controlled according to FIG. 5) and a fixed duty cycle controller including a dead time control circuit. FIG. 24 shows a zero inductor voltage three level converter as in FIG. 20, with a 50% fixed duty cycle controller including a dead time control circuit. According to such embodiments, during dead time, the inductor voltage will be related to the input voltage, output voltage, and capacitor DC voltage, which is much larger than the capacitor ripple voltage. By reducing the dead time duration, the volt-second across the inductor is also reduced and therefore, a smaller inductor may be used for same value of Inductor ripple current. In practice, the duration of the dead time may be, e.g., up to about 50 nanoseconds (ns), or greater, e.g., 75 ns, or 100 ns, or up to about 200 ns.

Figure 25:
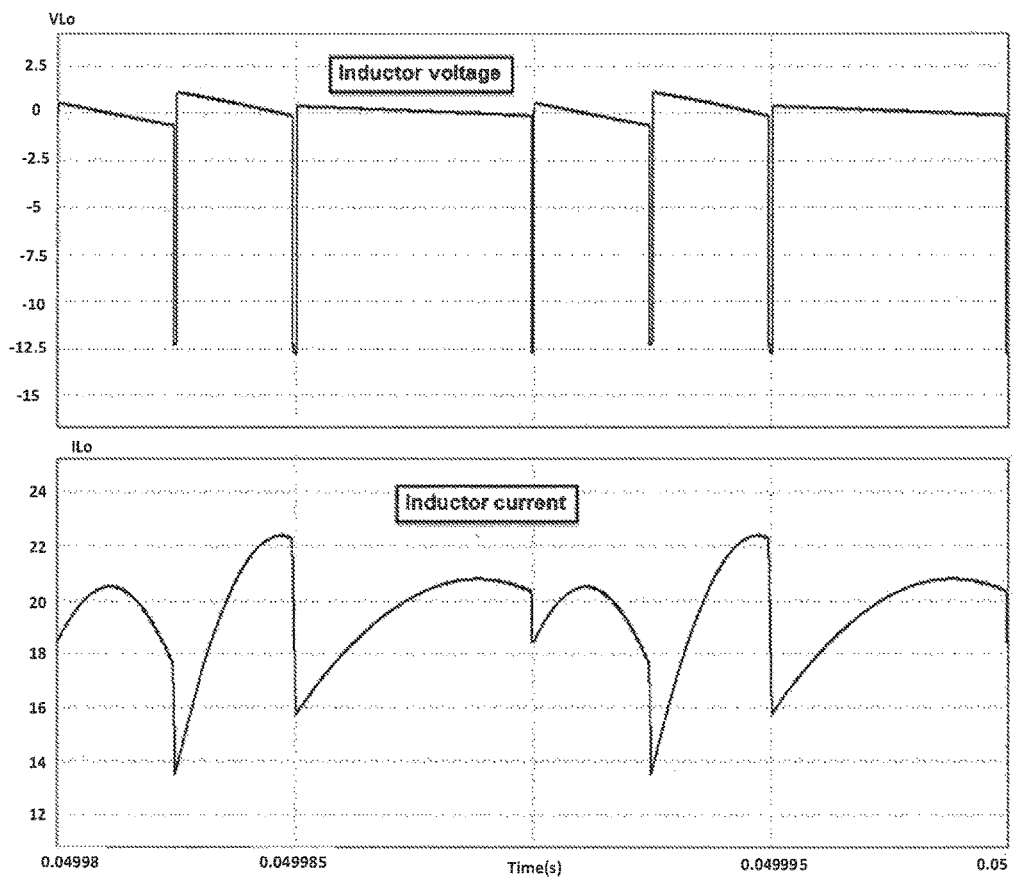
FIG. 25 shows simulated inductor voltage (top) and inductor current (bottom) waveforms for the DC-DC converter circuit of FIG. 23, when dead time is considered

For example, for the embodiment shown in FIG. 4 and controlled according to FIG. 5, during the dead time between M6 turning off and M5 and M7 turning on, all of M5, M6, and M7 are off. The node voltage N2 (the left side of the inductor) will be reduced to zero through the body diodes of M6 and M7. At this time, the right side of the inductor voltage is 12V (Vo). Therefore, −12V is applied to the inductor Lo during the dead time. This will cause higher inductor current ripple than the case when dead time is neglected. Similarly, the dead time of other switch pairs will also introduce higher voltage across the inductor. However, the dead time is generally very small as compared to the switching cycle or to the on time of the MOSFET. With current technology, the dead time may be controlled to less than 50 nanoseconds. Therefore, the impact of the dead time on the inductor current ripple is small. FIG. 25 shows the inductor voltage (top) and inductor current (bottom) waveforms when dead time is present for the circuit of FIG. 23.

Figure 26:
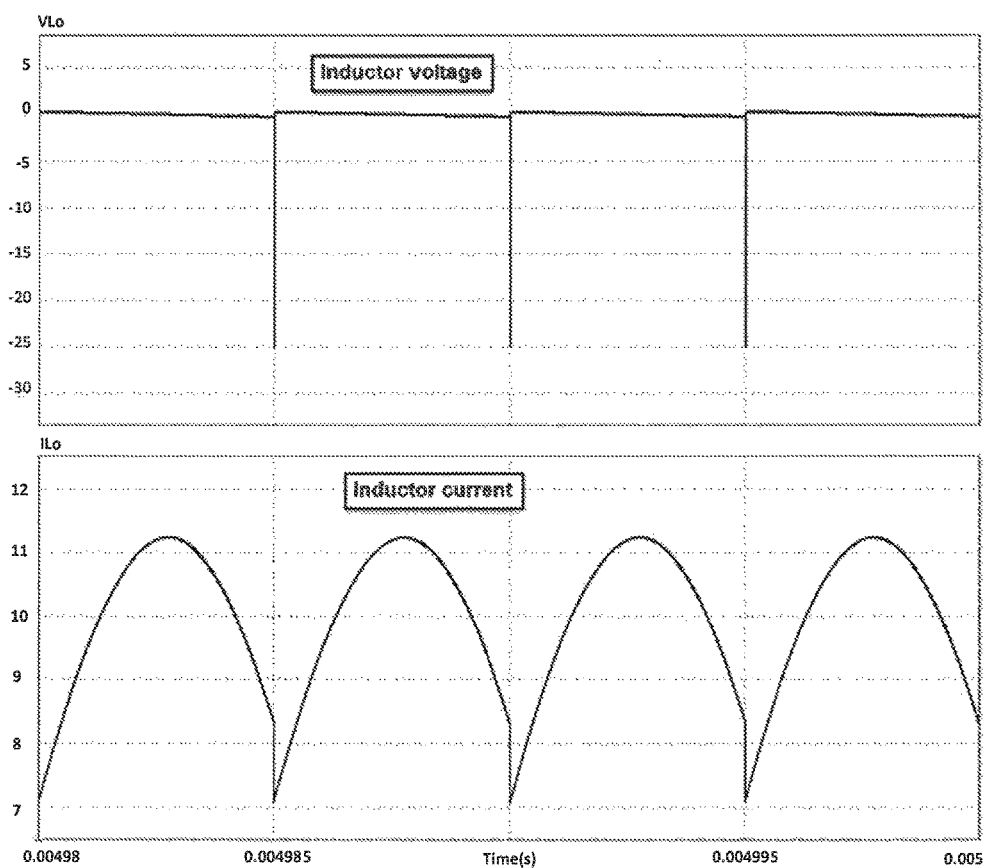
FIG. 26 shows simulated inductor voltage (top) and inductor current (bottom) waveforms for the DC-DC converter circuit of FIG. 24, when dead time is considered.

When dead time is considered for the zero inductor voltage three-level converter and 50% fixed duty cycle controller shown in FIG. 24, the inductor voltage (top) and the inductor current (bottom) waveforms are shown in FIG. 26. It is shown that during dead time, the inductor voltage is negative 25V (i.e., sum of the output voltage of 24V and MOSFET body diode voltage drop).

Output Impedance Simulation

A benefit of zero inductor voltage converter embodiments is that very small filter inductor may be used as the output filter inductor Lo. That is, the embodiments reduce the output inductor value while achieving acceptable inductor current ripple. Benefits of a smaller output inductor include a small converter volume, easier damping, and lower peak output impedance. In some applications, lower peak output impedance is very important.

Figure 27:
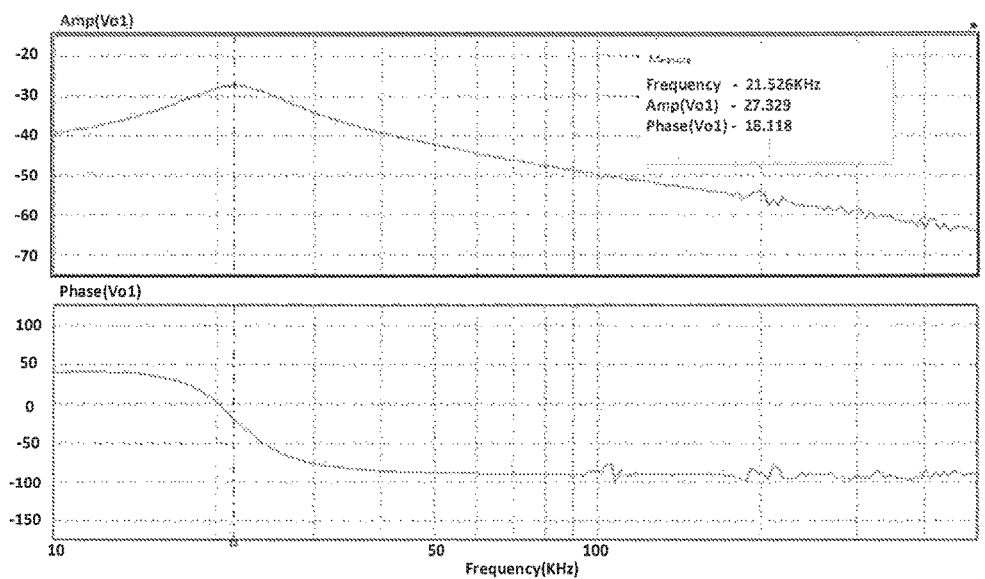
FIG. 27 shows the simulated output impedance of a zero inductor voltage seven switch converter embodiment of FIG. 18, wherein the upper plot is the magnitude of the output impedance and the lower plot is the phase of the output impedance.

FIG. 27 shows the simulated output impedance of a zero inductor voltage seven switch converter embodiment with fixed 25% and 50% duty cycle, as shown in FIG. 18. In FIG. 27 the upper plot is the magnitude of the output impedance and the lower plot is the phase of the output impedance. In the simulation, C1=200 µF, C2=400 µF, Lo=100 nH, Co=500 µF and Lo=100 nH. The ESR of the capacitors is assumed to be zero. The on resistor of all seven MOSFETs is assumed to 2 milliohm. It can be seen that the peak impedance is about −27.3 db, or 43 milliohm at frequency of 21.5 KHz, which corresponds to the resonant frequency of the output inductor Lo (100 nH) and the output capacitor Co (500 μF).

The invention claimed is:

1. A method for controlling a DC-DC converter, wherein the DC-DC converter comprises:
first and second input terminals and first and second output terminals, wherein the second input terminal and the second output terminal are connected together as a common terminal;
a first four switch (4S) stage comprising first, second, third, and fourth switches electrically connected together in series, wherein a first 4S stage input point is an input terminal of the first switch, a first 4S stage common point is an output terminal of the fourth switch, and a first 4S stage output point is between the second and third switches;
a first capacitor connected in parallel with the second and third switches;
wherein the first 4S stage input point is connected to the first input terminal of the DC-DC converter and the first 4S stage common point is connected to the common terminal;
a first three switch (3S) stage having a first 3S stage input point connected to the first 4S stage output point, a first 3S stage output point, and a first 3S stage common point connected to the common terminal;
wherein the first 3S stage comprises fifth, sixth, and seventh switches electrically connected together in series between the first 3S stage input point and the first 3S stage common point;
wherein the fifth switch is connected between the first 3S stage input point and the first 3S stage output point;
wherein the sixth and seventh switches are electrically connected together in series between the first 3S stage output point and the first 3S stage common point;
a second capacitor connected in parallel with the fifth and sixth switches;
a first inductor connected between the first 3S stage output point and the first output terminal; and
a third capacitor connected across the first and second output terminals;
wherein the method comprises:
turning on the first and third switches for a first 25% of a switching cycle;
turning on the second and fourth switches for a second 25% of the switching cycle;
turning on the fifth and seventh switches for a first 50% of the switching cycle;
turning on the sixth switch for a second 50% of the switching cycle;
wherein an output DC voltage of the DC-DC converter is 0.25 times an input DC voltage of the DC-DC converter; and
wherein a voltage across the first inductor is substantially zero volts.

2. The method of claim 1, wherein the DC-DC converter comprises:
an eighth switch connected between the first 4S stage output point and the first 3S stage input point;
wherein the method comprises:
turning on the first and third switches for a first 25% of a first switching cycle at a first switching frequency;
turning on the second and fourth switches for a second 25% of the first switching cycle at the first switching frequency;
turning on the eighth and sixth switches for a first 50% of a first switching cycle at a second switching frequency;
turning on the fifth and seventh switches for a second 50% of the first switching cycle at the second switching frequency;
wherein an output DC voltage of the DC-DC converter is 0.25 times an input DC voltage of the DC-DC converter; and
wherein a voltage across the first inductor is substantially zero volts and a voltage across the second inductor is substantially zero volts.

3. The method of claim 2, wherein:
the first switching frequency and the second switching frequency are different; or
the first switching frequency and the second switching frequency are the same and a phase of the first stage and a phase of the second stage are different, or
the first switching frequency and the second switching frequency are the same and a phase of the first stage and a phase of the second stage are the same.

4. The method of claim 2, further comprising controlling a dead time of the first to eighth switches;
wherein a duration of the dead time is less than 200 nanoseconds.

5. The method of claim 1, further comprising controlling a dead time of the first to seventh switches;
wherein a duration of the dead time is less than 200 nanoseconds.

6. The method of claim 1, wherein the DC-DC converter comprises a second 3S stage connected between the first 3S stage output point and the first inductor;
wherein the second 3S stage comprises ninth, tenth, and eleventh switches electrically connected together in series across the sixth and seventh switches;
a fourth capacitor connected in parallel with the tenth and eleventh switches;
wherein the first terminal of the first inductor is connected between the ninth and tenth switches and the second terminal of the first inductor is connected to the first output terminal; and
the second capacitor is connected across the first and second output terminals;
wherein the method comprises:
turning on the first and third switches for a first 12.5% of a switching cycle;
turning on the second and fourth switches for a second 12.5% of the switching cycle;
turning on the fifth and seventh switches for a first 25% of the switching cycle;
turning on the sixth switch for a second 25% of the switching cycle;
turning on the ninth and tenth switches for a first 50% of the switching cycle;
turning on the eleventh switch for a second 50% of the switching cycle;
wherein an output DC voltage of the DC-DC converter is 0.125 times an input DC voltage of the DC-DC converter; and
wherein a voltage across the first inductor is substantially zero volts.

7. The method of claim 6, further comprising controlling a dead time of the switches.

8. The method of claim 7, wherein the duration of the dead time is less than 200 nanoseconds.

9. A DC-DC converter, comprising:
a first input terminal adapted to receive an input DC voltage;
a common terminal;
a first four switch (4S) stage comprising:
first, second, third, and fourth switches electrically connected together in series, wherein a first 4S stage input point is an input terminal of the first switch, a first 4S stage common point is an output terminal of the fourth switch, and a first 4S stage output point is between the second and third switches;
a first capacitor connected in parallel with the series-connected second and third switches;
wherein the first 4S stage input point is connected to the first input terminal of the DC-DC converter and the first 4S stage common point is connected to the common terminal;
a first three switch (3S) stage having a first 3S stage input point connected to the first 4S stage output point, a first 3S stage output point, and a first 3S stage common point connected to the common terminal;
wherein the first 3S stage comprises fifth, sixth, and seventh switches electrically connected together in series between the first 3S stage input point and the first 3S stage common point;
wherein the fifth switch is connected between the first 3S stage input point and the first 3S stage output point;
wherein the sixth and seventh switches are electrically connected together in series between the first 3S stage output point and the first 3S stage common point;
a second capacitor connected in parallel with the fifth and sixth switches;
an output circuit connected to the first 3S stage output point, comprising a series inductor, a parallel capacitor, and a first output terminal adapted to output a DC voltage; and
a controller that controls the first 4S stage switches such that the first and third switches are switched on and off together, the second and fourth switches are switched on and off together, the first and third switches are not on when the second and fourth switches are on, and the duty cycle of the switches is 25% or less;
wherein the controller controls the first 3S stage switches such that the fifth and seventh switches are switched on and off together, the sixth switch is switched on and off, the fifth and seventh switches are not on when the sixth switch is on, and the duty cycle of the first 3S stage switches is 50%;
wherein an output DC voltage is 0.25 times the input DC voltage.

10. The DC-DC converter of claim 9, wherein the DC-DC converter comprises:
an eighth switch connected between the first 4S stage output point and the first 3S stage input point;
wherein the controller controls the switches such that:
the first and third switches are switched on and off together for a first 25% of a first switching cycle at a first switching frequency;
the second and fourth switches are switched on and off together for a second 25% of the first switching cycle at the first switching frequency;
the eighth and sixth switches are switched on and off together for a first 50% of a first switching cycle at a second switching frequency; and
the fifth and seventh switches are switched on and off together for a second 50% of the first switching cycle at the second switching frequency;
wherein an output DC voltage of the DC-DC converter is 0.25 times an input DC voltage of the DC-DC converter; and
wherein a voltage across the series inductor is substantially zero volts.

11. The DC-DC converter of claim 9, comprising a second 3S stage;
wherein the first and second 3S stages are cascaded by connecting the first 3S stage output point to a second 3S stage input point;
wherein the first 3S stage input point is connected to the first 4S stage output point, and a second 3S stage output point is connected to the output circuit;
wherein the controller controls the first 4S stage switches such that the duty cycle is 12.5%; and
wherein the controller controls the first 3S stage such that the duty cycle is 25%;
wherein the controller controls the second 3S stage such that the duty cycle is 50%;
wherein an output DC voltage is 0.125 times the input DC voltage.

12. The DC-DC converter of claim 9, comprising three or more 3S stages;
wherein the three or more 3S stages are cascaded by connecting the first 3S stage output point to a second 3S stage input point, connecting a second 3S stage output point to a third 3S stage input point, and continuing to a final 3S stage;
wherein the first 3S stage input point is connected to the first 4S stage output point, and a final 3S stage output point is connected to the output circuit;
wherein a total number of stages is N;
wherein the controller controls switches of the $N^{th}$ stage such that the duty cycle is 50%, and controls the switches of each preceding stage such that the duty cycle decreases by half for each preceding stage;
wherein the output DC voltage is equal to the input DC voltage divided by $2^N$.

13. The DC-DC converter of claim 9, wherein the controller further comprises a dead time control circuit, wherein the controller controls duration of the dead time to be less than 200 nanoseconds.

* * * * *